United States Patent
Fujita et al.

(10) Patent No.: US 7,646,536 B2
(45) Date of Patent: Jan. 12, 2010

(54) REFLECTIVE SCREEN AND DISPLAY SYSTEM

(75) Inventors: Kazuhiro Fujita, Tokyo (JP); Atsushi Takaura, Tokyo (JP); Issei Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/108,904

(22) Filed: Apr. 24, 2008

(65) Prior Publication Data

US 2008/0297895 A1 Dec. 4, 2008

(30) Foreign Application Priority Data

Jun. 1, 2007 (JP) ............................. 2007-147355

(51) Int. Cl.
*G03B 21/60* (2006.01)

(52) U.S. Cl. ...................... 359/459; 359/742

(58) Field of Classification Search .................. 359/443, 359/449, 459, 742–743
See application file for complete search history.

(56) References Cited

U.S. PATENT DOCUMENTS

| | | | | | |
|---|---|---|---|---|---|
| 2,974,564 | A | * | 3/1961 | Miller | 353/79 |
| 6,023,369 | A | * | 2/2000 | Goto | 359/443 |
| 6,574,041 | B1 | * | 6/2003 | Chen | 359/459 |
| 6,839,168 | B2 | * | 1/2005 | Kobayashi | 359/446 |
| 6,898,008 | B1 | * | 5/2005 | Sun | 359/443 |
| 7,495,828 | B2 | * | 2/2009 | Ishii | 359/449 |
| 2008/0088921 | A1 | * | 4/2008 | Yonekubo et al. | 359/459 |
| 2009/0059365 | A1 | * | 3/2009 | Rickers et al. | 359/459 |

FOREIGN PATENT DOCUMENTS

| | | |
|---|---|---|
| JP | 2004-177427 | 6/2004 |
| JP | 2005-134448 | 5/2005 |
| JP | 2006-162966 | 6/2006 |
| JP | 2006-215162 | 8/2006 |

* cited by examiner

*Primary Examiner*—Christopher Mahoney
(74) *Attorney, Agent, or Firm*—Oblon, Spivak, McClelland, Maier & Neustadt, L.L.P.

(57) ABSTRACT

A disclosed reflective screen is configured to display an image projected from a projection device located within a short distance. The reflective screen comprises a first reflective surface configured to reflect, in a substantially same direction, projection light beams projected from a first position, and a second reflective surface configured to reflect, in the substantially same direction, projection light beams projected from a second position different from the first position.

16 Claims, 18 Drawing Sheets

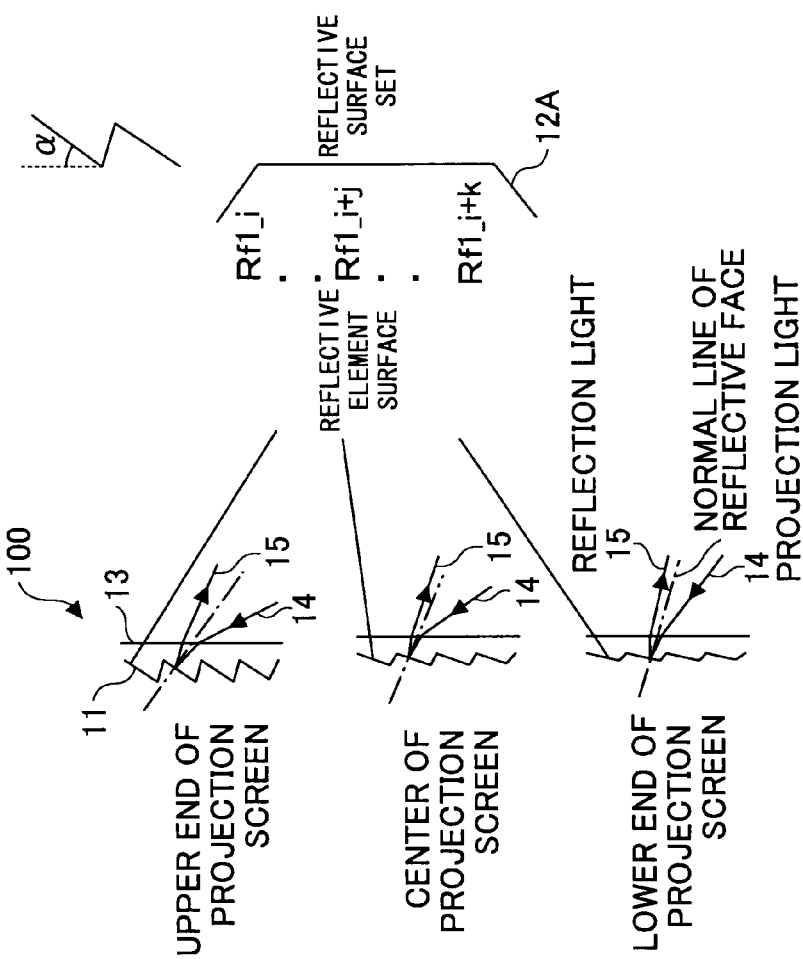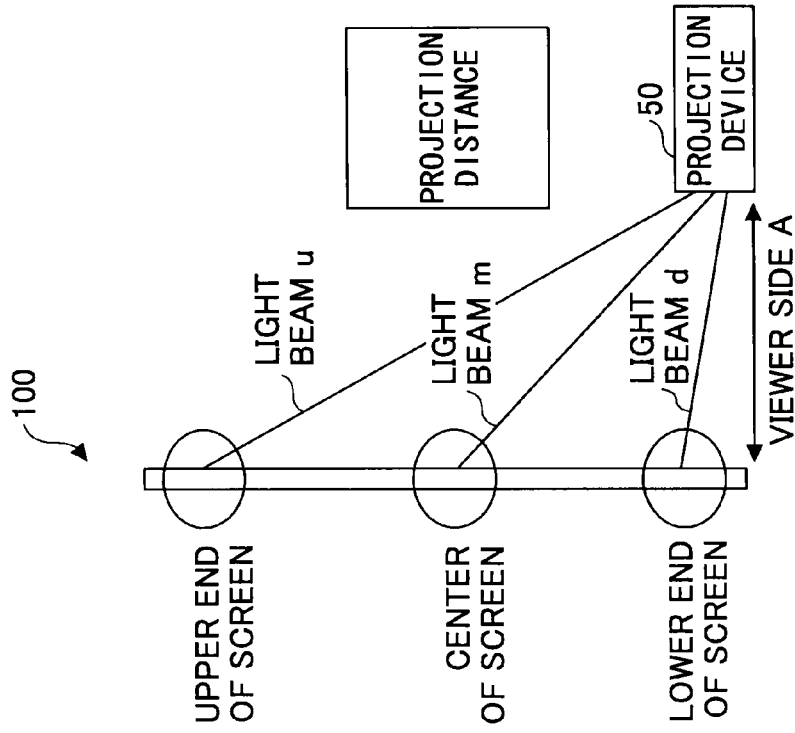

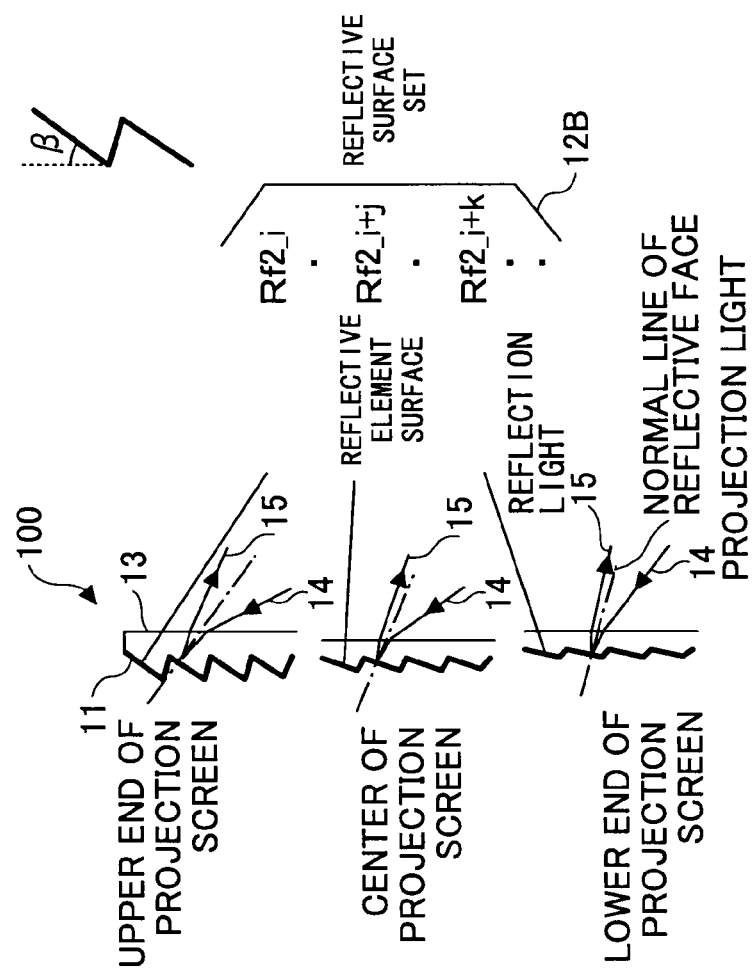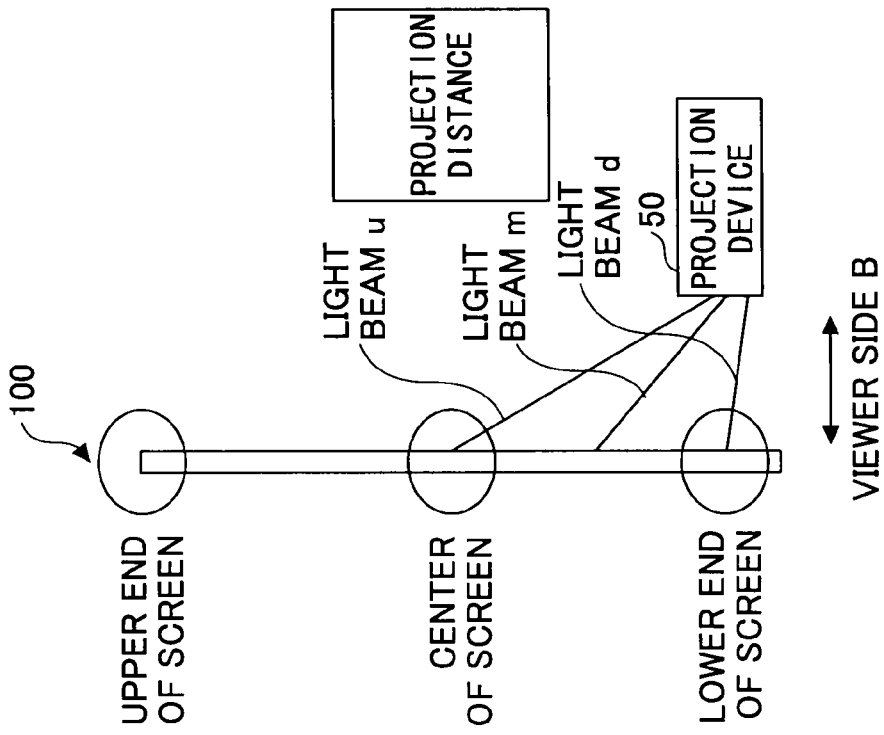

FIG.8
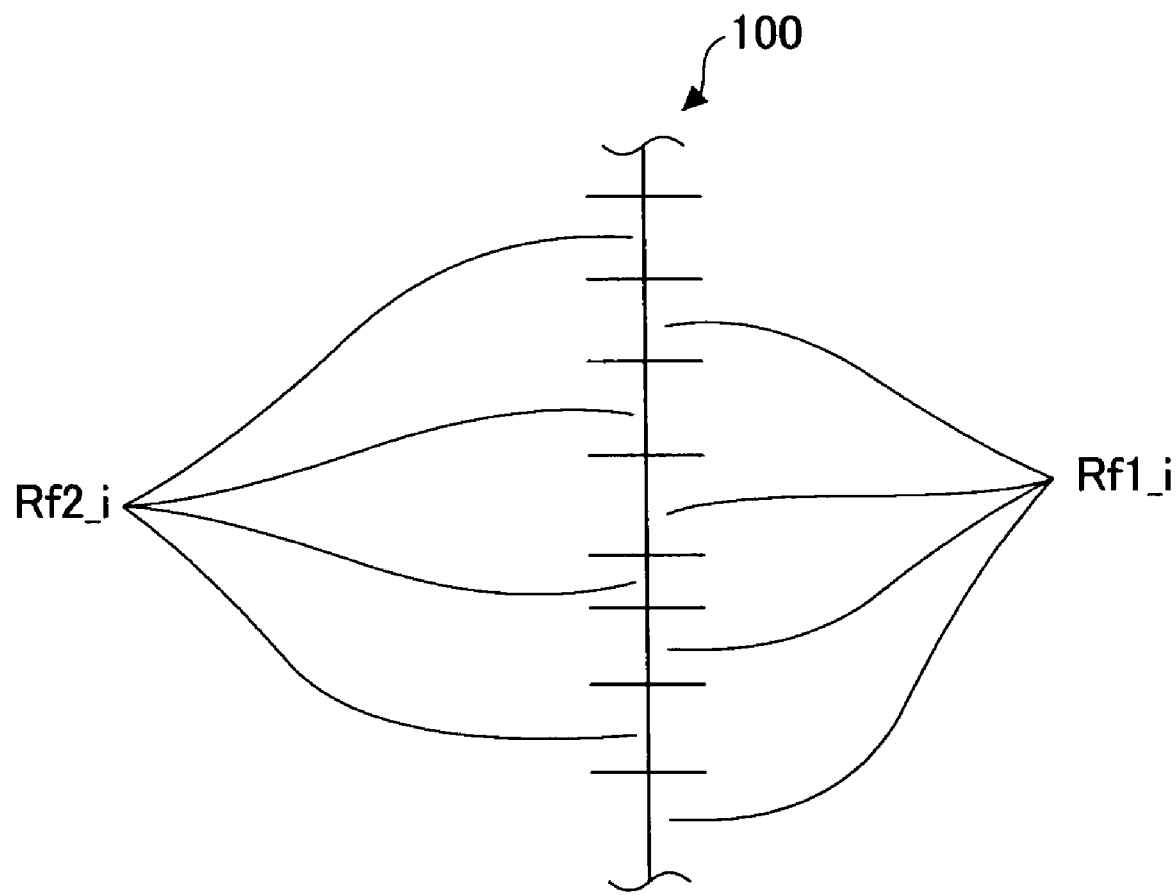
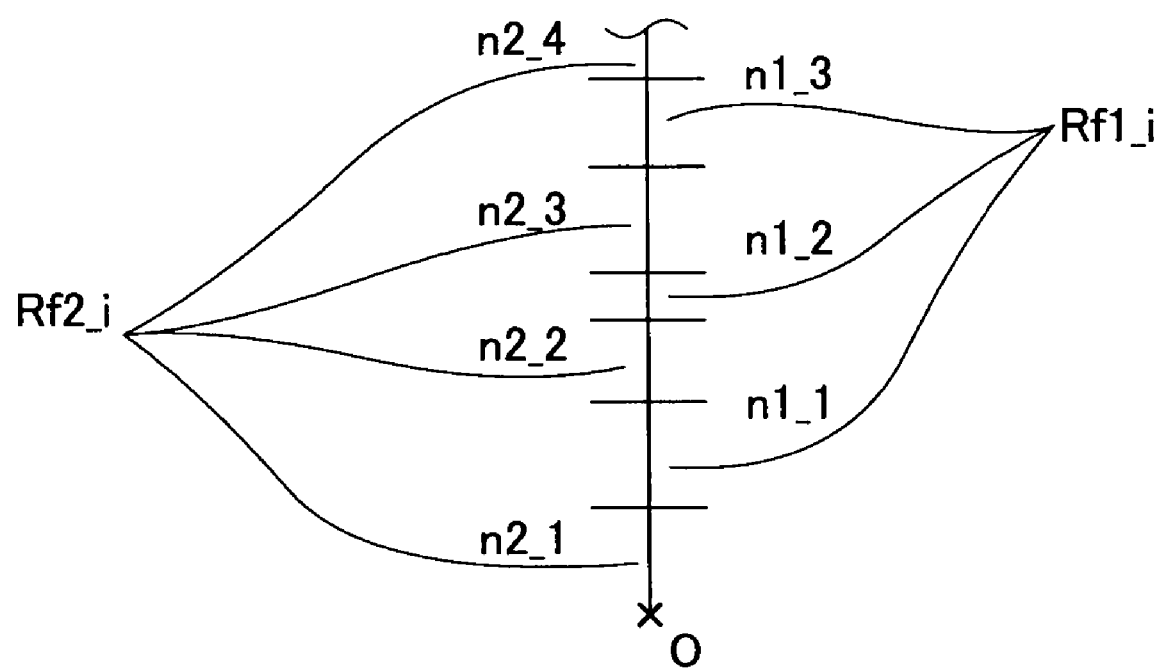

- TRANSPARENT LAYER 51
- REFLECTIVE ELEMENT SURFACE 51a
- MIRROR REFLECTIVE LAYER 52
- REFLECTIVE LAYER 53
- DIFFUSION LAYER 54
- REFLECTIVE SCREEN 50
- POLARIZATION ABSORBING LAYER 55
- PROJECTION LIGHT 11a
- ANTI-GLARE LAYER 56

REFLECTIVE SCREEN AND DISPLAY SYSTEM

BACKGROUND OF THE INVENTION

1. Field of the Invention

The present invention generally relates to a reflective screen and a display system that display an image projected by a projection device, and particularly relates to a reflective screen and a display system that allow projection of an image from close range.

2. Description of the Related Art

There have been projectors configured to enlarge and project an image using a CRT or liquid crystal and overhead projectors (OHPs) configured to enlarge and project an image formed on a transparent sheet. These projectors usually project an enlarged image onto a screen. It is preferable that such a projector be placed in front of the screen, but the projector is sometimes not located in front of the screen because of limitations such as viewers' positions.

If, for example, a projector is disposed under the screen, the incident angle of the projection light on the screen varies in the vertical direction of the screen, so that the luminance decreases from the lower side to the upper side.

In view of such a problem, Japanese Patent Laid-Open Publication No. 2005-134448 (Patent Document 1) discloses a screen including a Fresnel reflective surface. FIG. 17A is a cut-away side view illustrating a screen 50 disclosed in Patent Document 1. In this screen 50, a reflective layer 53 includes multiple small projections and recesses such as, for example, arcuate reflective element surfaces 51a each having about 0.1 mm width. The reflective element surfaces 51a are arranged in a concentric pattern to form a circular Fresnel shape. The circular Fresnel reflective element surfaces 51a reflect an incident light 11a from a projector as collimated beams in the direction perpendicular to the front surface of the screen 50, thereby preventing luminance from decreasing toward the upper side.

Japanese Patent Laid-Open Publication No. 2004-177427 (Patent Document 2) discloses a screen including tilted surfaces as reflective surfaces. FIG. 17B is a cut-away side view of the screen disclosed in Patent Document 2. This screen includes tilted surfaces 61 as reflective surfaces, which are configured to reflect light beams projected from a projector in a desired direction and are alternately arranged with light absorbing surfaces 62, thereby preventing reduction of luminance in the upper side of the screen.

Japanese Patent Laid-Open Publication No. 2006-215162 (Patent Document 3) discloses a screen including projecting portions with reflective surfaces formed thereon. FIG. 17C is a cut-away side view of the screen disclosed in Patent Document 3. This screen includes a large number of projecting portions 71 of the same shape, which are regularly and two-dimensionally arranged. A reflective surface is formed on a part of the surface of each projecting portion facing the incident direction of projection light. The remaining part of the surface of the projecting portion is covered with a coating having high light absorption, thereby preventing the outside light from being reflected to the viewer side. With this configuration, the screen achieves high contrast and high luminance.

There is a tendency to place a projector closer to screens because of limited space for the projector. FIG. 18 shows an example of luminance variation in a related-art reflective screen with respect to the incident angle of projection light on the screen. Luminances in predetermined positions on the screen were measured by an illuminance meter placed parallel to the screen surface. The luminances are represented by relative values to the luminance at a 20-degree incident angle (with reference to the line perpendicular to the screen surface). The luminance at a 20-degree incident angle was defined as 1. As shown in FIG. 18, in the related-art reflective screen, the substantial brightness decreases as the incident angle of the light from the projector on the screen increases.

For example, the substantial amount of light at a 50 degree incident angle is 50% of that at an about 20 degree incident angle. That is, in the related-art screen, the ambient luminance (substantial brightness) is reduced according to the incident angle. The shorter the distance from the regular projection position of the projector to the screen is, which regular projection position is determined based on the focal distance of the projector, the more prominent the luminance reduction due to a change in the distance from the regular projection position. If the regular projection position of a projector is relatively far from the screen, because a diffuse surface of the screen diffuses light, a change in the distance to the screen does not result in such a sharp drop in luminance.

That is, the closer the projection position is, the more the screen for the projector is required to reduce luminance variation and luminance decline by compensating for the change in the distance due to limitations on space.

Patent Document 1-3 do not take into consideration the problem with a projector being located close to the screen. For example, the screens of Patent Document 1 and 2 cannot react to a change in the position of a projector because of a Fresnel focal position being constant and or the tilted surfaces being uniform. More specifically, the screen of Patent Document 1 requires a projector to be located in the Fresnel focal position. If the projector is not in the Fresnel focal position, a desired reflection angle cannot be achieved due to the fixed angle of the Fresnel reflective surface, resulting in a brightness variation within the screen. As for the screen of Patent Document 2, because the tilted surfaces 61 are tilted uniformly, only a small number of the tilted surfaces 61 can reflect light to the viewer side depending on the irradiation position of a projector. As for the screen of Patent Document 3, because the projecting portions 71 reflect projection light in different directions, some light is reflected to the viewer side even if the irradiation position of a projector is changed. However, if the projector is located within a short distance, the absolute luminance becomes insufficient.

SUMMARY OF THE INVENTION

In view of the foregoing, the present invention is directed to provide a screen and a display system combined with a projection device that, in the case where projection light is projected from close range, reduce luminance drop and luminance variation, thereby displaying a high quality image.

In one embodiment of the present invention, there is provided a reflective screen configured to display an image projected from a projection device located within a short distance. The reflective screen comprises a first reflective surface configured to reflect, in a substantially same direction, projection light beams projected from a first position; and a second reflective surface configured to reflect, in the substantially same direction, projection light beams projected from a second position different from the first position.

According to this embodiment, it is possible to prevent luminance reduction on the screen surface due to incident angles of the projection light beams incident on the screen, and to reduce luminance variation due to a change in the positional relationship between the projection device and the screen.

In one aspect, the area ratio of the first reflective surface to the second reflective surface may be determined according to an allowable range of an installation position of the projection device.

According to this aspect, the coverage for a change in the positions of the projection device and the screen can be further enhanced.

In another aspect, in the case where the second position is closer to the reflective screen than is the first position, if the allowable range of the installation position in a direction closer to the reflective screen is greater than the allowable range of the installation position in a direction distant from the reflective surface, the area of the second reflective surface is greater than the area of the first reflective surface.

According to this aspect, the allowable range and the direction of the installation position can be adjusted by the area ratio of the second reflective surface and the first reflective surface.

In another aspect, the first reflective surface includes plural first reflective element surfaces that have increasing inclination angles corresponding to respective distances from a predetermined position, and the second reflective surface includes plural second reflective element surfaces that have increasing inclination angles corresponding to respective distances from the predetermined position. The first reflective element surfaces and the second reflective element surfaces are arranged in a mixed form.

According to this aspect, it is possible to reduce luminance variation even if there is a change in the positional relationship between the projection device and the screen by including the first and second reflective element surfaces as desired.

In another aspect, the above-described reflective screen may further comprise a third reflective surface configured to reflect, in the substantially same direction, projection light beams projected from a third position different from the first position and the second position.

According to this aspect, it is possible to further reduce luminance variation within the screen surface.

In another aspect, arrays of a predetermined number of the first reflective element surfaces and arrays of the predetermined number of the second reflective element surfaces may be alternately arranged in a radial direction of concentric circles having a center on the predetermined position.

According to this aspect, it is possible to reduce luminance variation across the entire screen surface even if the projection position is changed.

In another aspect, the individual first reflective element surfaces and the individual second reflective element surfaces may be alternately arranged in a radial direction of concentric circles having a center on the predetermined position.

According to this aspect, it is possible to reduce moire in the projected image.

In another aspect, arrays of a random number of the first reflective element surfaces and arrays of a random number of the second reflective element surfaces may be alternately arranged in a radial direction of concentric circles having a center on the predetermined position.

According to this aspect, it is possible to prevent moire on the screen surface and reduce luminance variation.

In one aspect, the first reflective element surfaces and the second reflective element surfaces may be continuously connected to form plural recessed portions.

According to this aspect, it is possible to increase the overall luminance of the screen surface and to reduce luminance variation even if there is a change in the positional relationship between the projection device and the screen.

In another aspect, the first reflective surface and the second reflective surface may be roughened.

According to this aspect, it is possible to prevent an excessive increase in luminance in a predetermined viewer position due to specular reflection.

In another aspect, the above-described reflective screen may further include a scale unit configured to indicate a position close to the first position or the second position.

According to this aspect, it is possible to show a preferable position for installing the projection device.

In another aspect, the above-described reflective screen may further include a vertical direction determining unit configured to determine a vertical direction of the reflective screen or a vertical direction of the image.

According to this aspect, it is possible to prevent incorrect installation of the screen.

In another aspect, the vertical direction determining unit may be removable or erasable.

According to this aspect, because the vertical direction determining unit is not used after installation, the appearance can be improved by removing the vertical direction determining unit after installation.

According to an aspect of the present invention, it is possible to provide a screen and a display system combined with a projection device that, in the case where projection light is projected from close range, prevent luminance reduction and luminance variation, thereby displaying a high quality image.

BRIEF DESCRIPTION OF THE DRAWINGS

FIGS. 2A and 2B are cut-away side views illustrating an example of a reflective face of a screen;

FIGS. 3A and 3B are cut-away side views illustrating an example of a reflective face of a screen;

FIG. 8 is a cut-away side view illustrating a screen wherein arrays of a random number of reflective surfaces of one type and arrays of a random number of reflective surfaces of another type are alternately arranged;

DETAILED DESCRIPTION OF THE PREFERRED EMBODIMENT

Preferred embodiments of the present invention are described hereinafter with reference to the accompanying drawings.

Figure 1A:
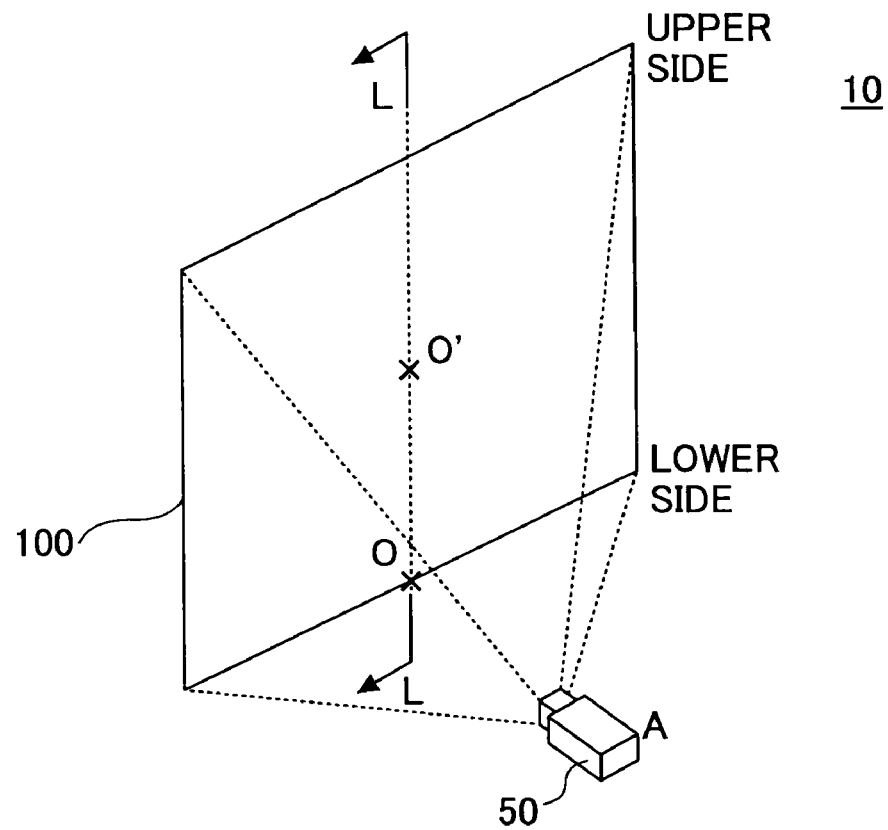
FIGS. 1A and 1B are diagrams illustrating an example of the position of a projection device relative to a screen.

FIG. 1A illustrates a display system 10 including a screen 100 and a projection device 50. The projection device 50 has an angle of view that allows projecting a rectangular image on the entire surface of the screen 100 with a size ranging from about 50 inches to preferably about 100 inches even if the projection device 50 is located within a short distance (e.g., less than 100 cm) from the screen 100. The projection device 50 has a lens shift function that enables projecting an image on the entire surface not only when the projection device 50 is placed in front of the screen 100 (an intersection O' between the screen and the optical axis is the substantial center) but also when an intersection O between the screen and the optical axis is in the substantial center at the lower end of the screen 100.

The screen 100 of this embodiment not only reduces luminance variation in, for example, the position away from the vicinity of the intersection O with the optical axis of the projection device 50 placed within such a short distance, but also makes the luminance, which can drop substantially due to the short distance in response to only a small movement of the projection device 50 from the screen 100, more robust against a change in the distance.

First Embodiment

Figure 1B:
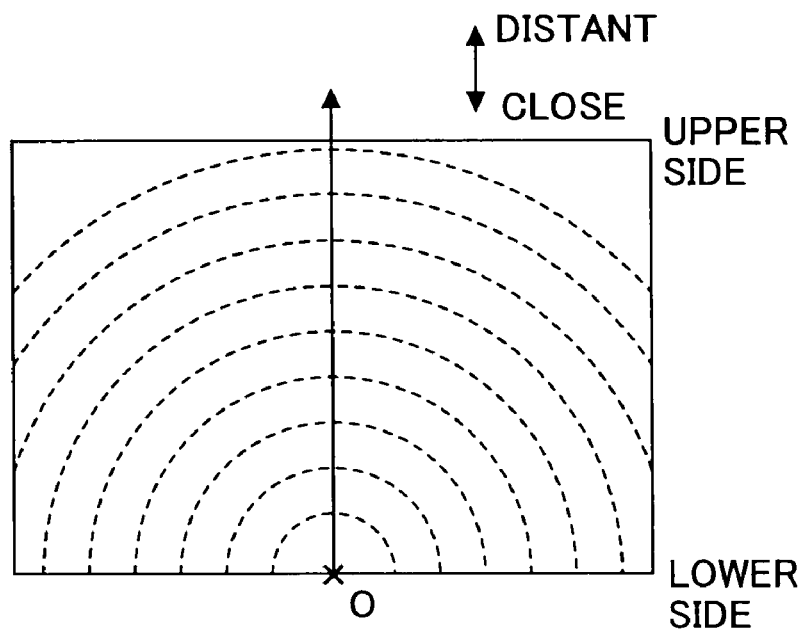

When the projection device 50 is arranged as shown in FIG. 1A, the equidistant lines between the projection device 50 and the screen 100 form concentric circles having their center on the intersection O as shown in FIG. 1B. Accordingly, the incident angle of projection light 14 increases in the radial direction of the concentric circles. In the following description, the radial direction of the concentric circles having their center on the intersection O is defined as the distance direction (the more distant from the intersection O, the more distant from the projection device 50). The projection device 50 is described below as being located to face the lower end of the screen 100 as shown in FIG. 1A. However, the projection device 50 may be located to face the right end, left end, or any of left, right, upper, and lower corners. In such a case, the distance direction in the screen 100 is defined relative to the position of the projection device 50.

FIGS. 2A-2B and 3A-3B are cut-away side views illustrating an example of a reflective face 11 of the screen 100 of this embodiment. FIGS. 2A and 3A illustrate side views of the projection device 50 and the screen 100. FIGS. 2B and 3B illustrate cross-sectional views of the screen 100 taken along line L-L of FIG. 1A.

The reflective face 11 of the screen 100 of this embodiment includes a reflective surface set 12A for a projection distance A and a reflective surface set 12B for a projection distance B. In the reflection surface set 12A, inclination angles α are formed such that the projection light from the projection device 50 spaced apart from the screen 100 by the distance A is reflected to the viewer side. Herein, elements of the reflective surface set 12A are oriented to have angles that reflect the light projected from the projection device 50 spaced apart by the projection distance A to provide optimum specular reflection light 15, and are defined as reflective element surfaces Rf1_i. In other words, the reflective element surface Rf1_1, the reflective element surface Rf1_2, the reflective element surface Rf1_3 . . . form the reflective surface set 12A.

The reflective element surfaces Rf1_i are aligned with one another to form the reflective surface set 12A. Referring to light beams d, m, and u, the incident angles on the screen 100 increase with an increase of the distance from the intersection O. Therefore, the reflective element surfaces Rf1_i are oriented to have inclination angles α relative to the screen 100 which inclination angles α increase with an increase of the distance from the intersection O. The reflective element surfaces Rf1_i are independent from each other in terms of configuration. However, the reflective element surfaces Rf1_i may be considered as one group because they are related to each other in that the angles α increase with an increase of the distance from the intersection O. The angles α may increase continuously such that every reflective element surface Rf1_i has different inclination angles α, or may increase stepwise every predetermined number of the reflective element surface Rf1_i.

As shown in FIG. 2A, the inclination angles α of the reflective surface set 12A are selected such that projection light 14 from the projection distance A is reflected to the viewer side. The most preferred inclination angles α cause reflection of the projection light 14 and the specular reflection of the projection light 14 to travel to the viewer side. By increasing the inclination angles α of the reflective surface set 12A with an increase of the distance from the intersection O, the projection light 14 is more efficiently reflected to the viewer side. The viewer side as used herein refers to the direction of a viewer who observes or watches an image projected from the projection device 50 and displayed on the screen 100 of this embodiment. Specifically, the viewer side is preferably the direction of the normal line of the screen surface. Alternatively, the viewer side may be the direction of a position spaced apart from the screen 100 by a predetermined distance.

The configurations shown in FIGS. 3A and 3B are similar to the configurations shown in FIGS. 2A and 2B, but are different in projecting an image with the projection distance B which is shorter than the projection distance A. As in the case of the FIGS. 2A and 2B, elements of the reflective surface set 12B are oriented to have angles that reflect light projected from the projection device 50 spaced apart by the projection distance B to provide optimum specular reflection light 15, and are defined as reflective element surfaces Rf2_i.

Similar to the reflective surface set 12A, the reflective surface set 12B is formed of reflective element surfaces Rf2_i that are aligned with one another. Referring to light beams d, m, and u, the incident angles on the screen 100 increase with an increase of the distance from the intersection O. Therefore, the reflective element surfaces Rf2_i are oriented to have inclination angles β relative to the screen 100 which inclination angles β increase with an increase of the distance from the intersection O.

The reflective element surfaces Rf2_i are independent from each other in terms of configuration. However, the reflective element surfaces Rf2_i may be considered as one group because they are related to each other in that the angles β increase with an increase of the distance from the intersection O. The angles β may increase continuously such that every reflective element surface Rf2_i has different angles β or may increase stepwise every predetermined number of the reflective element surface Rf2_i.

As shown in FIG. 3A, the inclination angles α of the reflective surface set 12B are selected such that projection light 14 from the projection distance B is reflected to the viewer side. The most preferred angles β cause reflection of the projection light 14 and the specular reflection of the projection light 14 to travel to the viewer side. By increasing the inclination angles β of the reflective surface set 12B with an increase of the distance from the intersection O, the projection light 14 is more efficiently reflected to the viewer side.

As it is obvious from the relationship between the projection distances A and B, i.e., the projection distance A>the projection distance B, the relationship between the inclination angles α and β is the inclination angle β>the inclination angle α if they are in the same position on the screen 100.

The orientation of the reflective surface sets 12A and 12B is described below. Typically, because the projection screen of the screen 100 is a horizontally elongated rectangle, projection light beams are emitted radially from a projection lens of the projection device 50 toward the screen 100. Therefore, it is preferable that the reflective surface set 12A be formed in the radial direction of the concentric circles having their center on the intersection between the optical axis of the projection lens and the screen 100.

Figure 4A:
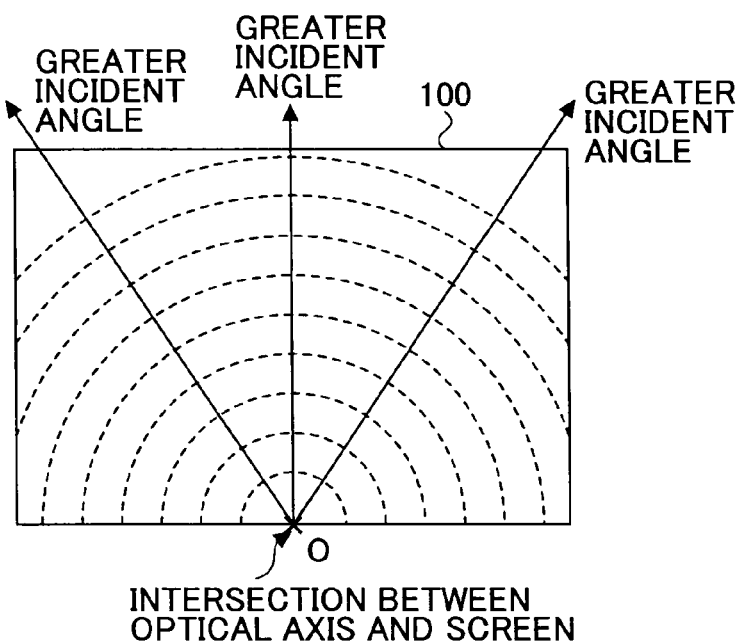
FIGS. 4A-4C are diagrams for explaining the relationship between the position of a projection device and reflective surface sets.
Figure 4B:
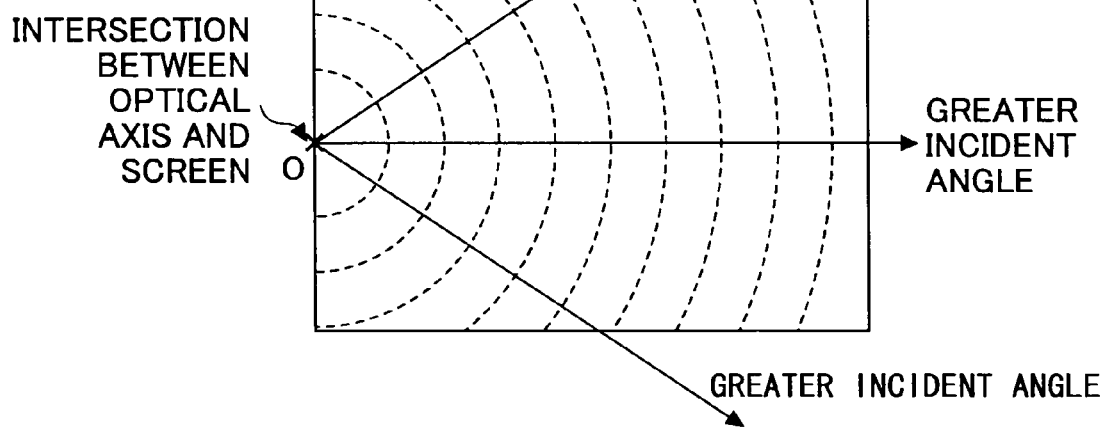
Figure 4C:
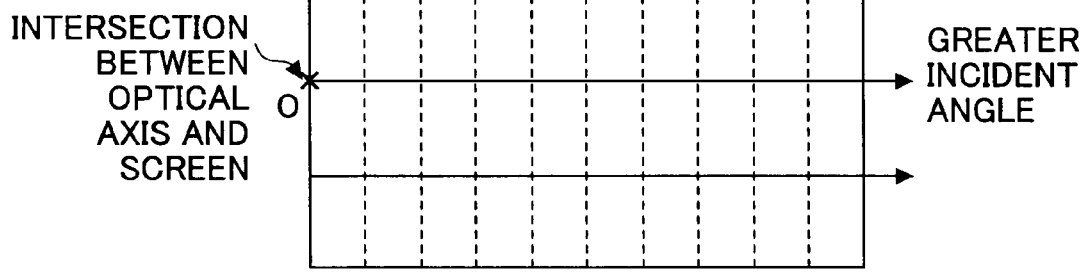

FIGS. 4A-4C are diagrams for explaining the relationship between the position of the projection device 50 and the reflective surface sets 12A and 12B. In FIG. 4A, the inclination angles α and β of the reflective surface sets 12A and 12B increase with an increase of the distance from the intersection O between the optical axis and the screen 100 in the radial direction of the concentric circles having their center on the intersection O.

As shown in FIG. 4B, in the case where the intersection O between the optical axis of the projection device 50 and the screen 100 is at the upper left corner, the inclination angles α and β of the reflective surface sets 12A and 12B increase with an increase of the distance from the intersection O between the optical axis and the screen 100 in the radial direction of the concentric circles having their center on the intersection O. It is to be noted that the inclination angles do not have to increase precisely radially from the intersection O. In an extreme example, in the case where the intersection O between the optical axis and the screen 100 is at the left end, the inclination angles may increase toward the right side as shown in FIG. 4C.

Figure 5A:
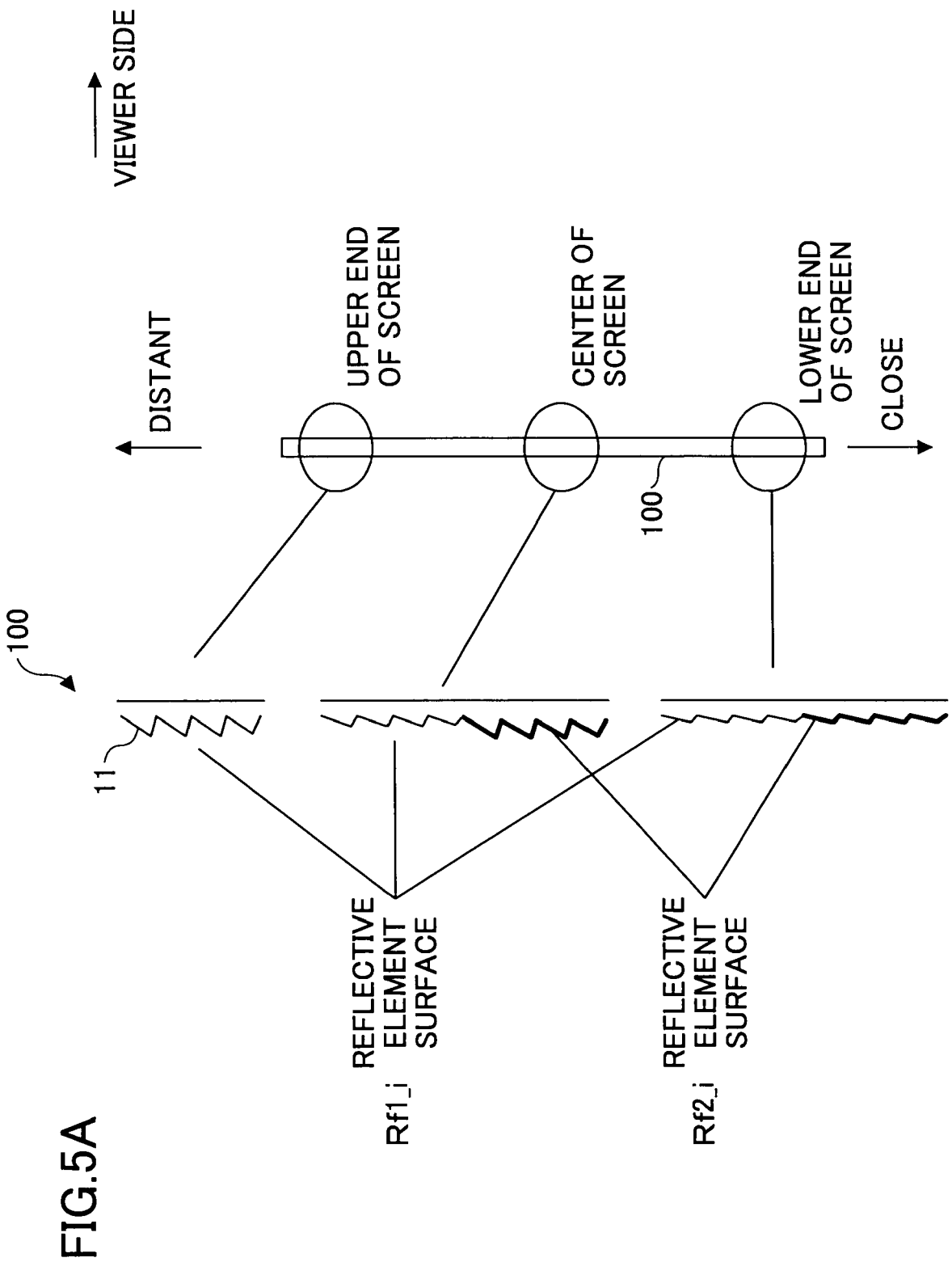
FIGS. 5A-5C are cut-away side views illustrating examples of screens according to an embodiment of the present invention.
Figure 5B:
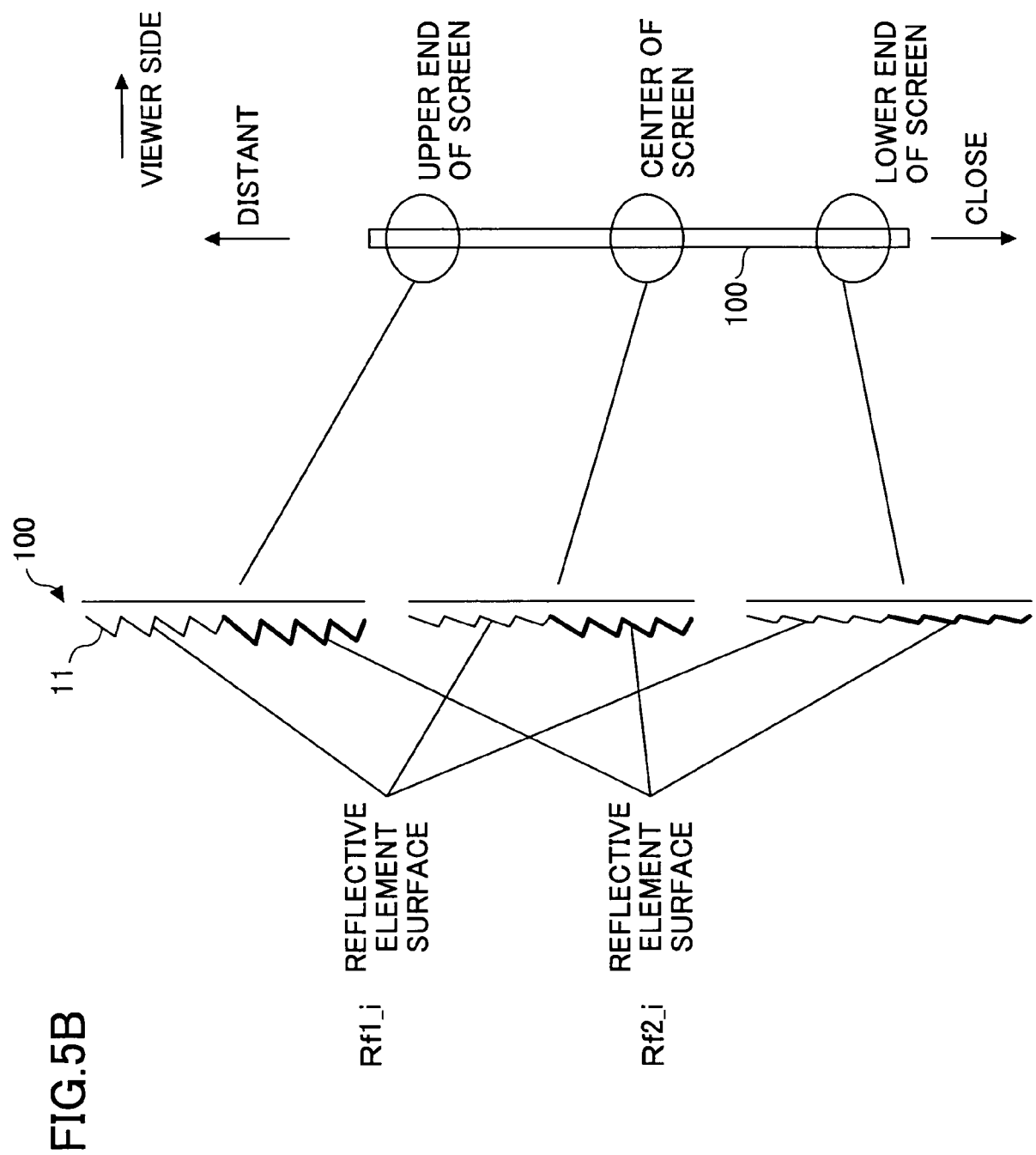
Figure 5C:
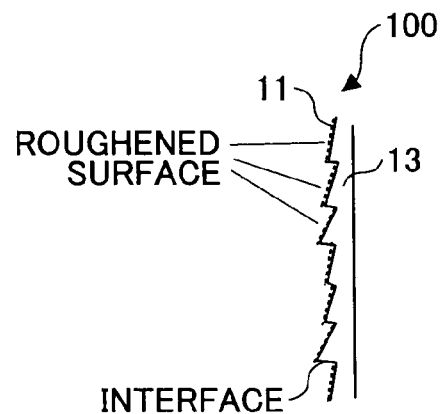
Figure 6:
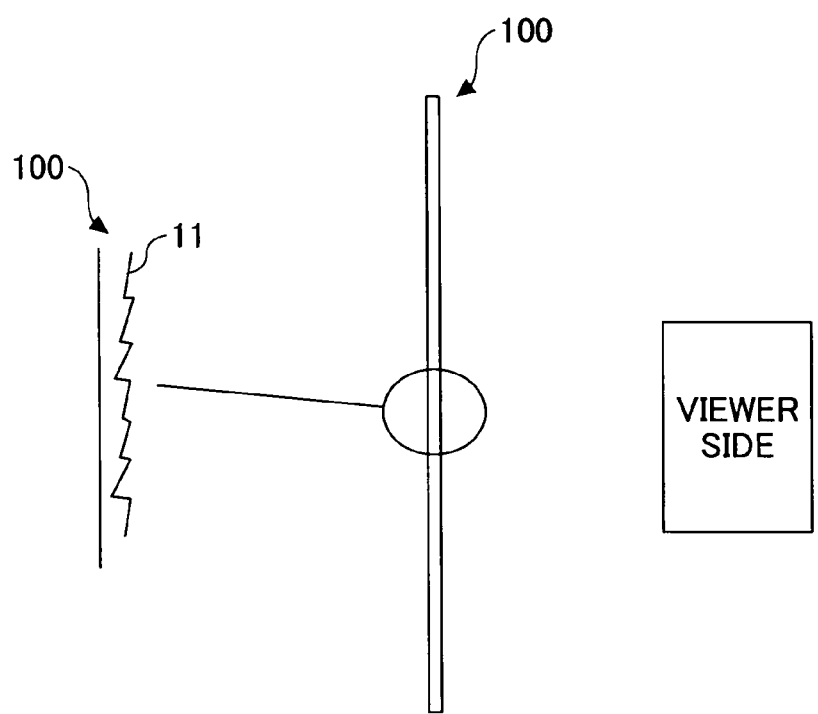
FIG. 6 is a cut-away side view of a screen configured to reflect projection light directly by a reflective face to the viewer side.

In the screen 100 of this embodiment, the reflective element surfaces Rf1_i and the reflective element surfaces Rf2_i are arranged in a mixed form. FIGS. 5A-5C are cut-away side views illustrating examples of the screen 100 of this embodiment. In the screens 100 shown in FIGS. 5A and 5B, arrays of a predetermined number of the reflective element surfaces Rf1_i and arrays of a predetermined number of the reflective element surfaces Rf2_i are alternately arranged.

An inclination angle β is greater than an inclination angle α in the substantially same position as the inclination angle position β. Therefore, any given portion containing more than a predetermined number of reflective element surfaces Rf1_i and Rf2_i in the radial direction of the concentric circles includes a set of a region of the inclination angles β and a region of the inclination angles α (which set is referred to as a "cycle"). The inclination angles α and β gradually increase as the cycle is repeated.

In FIG. 5A, the reflective element surfaces Rf2_i are disposed only in the portion below about the center of the screen 100. That is, while only the reflective element surfaces Rf1_i for the projection distance A are disposed in the upper portion, both the reflective element surfaces Rf1_i and the reflective element surface Rf2_i are disposed in the portion below the center. The differences between the inclination angles α and β of the reflective element surfaces Rf1_1 and Rf2_i that are closer to the intersection O are smaller than the differences between the inclination angles α and β of the reflective element surfaces Rf1_1 and Rf2_i that are spaced apart from the intersection O.

As shown in FIG. 5B, the reflective element surfaces Rf1_i and Rf2_i may preferably be arranged in a mixed form from the lower side to the upper side, thereby easily supporting a projection device 50 having a zoom function or different projection devices 50 of different focal distances.

The configurations shown in FIGS. 5A and 5B differ greatly from the configuration of the screen of Patent Document 1. The screen of Patent Document 1 has a structure (Fresnel shape), in which small reflective element surfaces are arranged in a concentric pattern and have angles that increase with an increase of the distance from the center of the concentric circles (for example, from the lower side to the upper side of the screen). In the screen 100 of this embodiment, since the reflective element surfaces Rf1_i and Rf2_i are alternately arranged, the angles of the reflective surface set 12A and 12B increase and decrease with an increase of the distance from the intersection O.

That is, the screen 100 of this embodiment includes plural types of reflective element surfaces Rf1_i and Rf2_i, the angles in the screen 100 increase and decrease with an increase of the distance from the intersection O, which is a defining structural difference from the screen of Patent Document 1.

In the screen 100, the reflective face 11 of a serrated shape is entirely covered with a transparent member 13 made of a PVC film or acrylic. The projection light 14 is incident from the interface of the transparent member 13, passes through the transparent member 13, is reflected by the reflective face 11 of the serrated shape, passes through the transparent member 13 again, and travels to the viewer side from the interface. The angles α and β in the reflective surface sets 12A and 12B are formed to reflect the projection light 14 to the viewer side. The reflective surface sets 12A and 12B are squares or rectangular of sides ranging several mm-several tens um.

The transparent member 13 may be made of any suitable material known in the art. The screen 100 may be covered with a white scattering member suitable for the screen 100. With the diffusion effects of the reflective surface sets 12A and 12B, it is possible to display a projected image. The diffusion effects prevent a sharp reduction in the amount of light even if there is some shift from the projection position A. The reflective surface set 12B for the projection position B reflects the projection light 14 before the amount of light decreases due to a great shift from the projection position A, thereby preventing a reduction in the amount of light. The transparent member 13 may include a suitable diffusion member or a diffusion sheet member.

In an alternative embodiment (not shown), the reflective element surfaces are formed on a film, and the film is attached to a glass substrate. The reflective element surfaces may be formed on the film by using a transferring technique such as shape transfer methods including a 2P method.

The reflective element surfaces Rf1_1 and Rf2_1 are preferably roughened surfaces as shown in FIG. 5C. If the reflective element surfaces Rf1_1 and Rf2_1 are mirror surfaces, the reflective element surfaces Rf1_1 and Rf2_1 can most efficiently reflect the projection light 14. However, it is too bright to directly see the projection light 14, and it is therefore difficult to obtain a display image. Using the reflective element surfaces Rf1_i and Rf2_i that are not mirror surfaces enables obtaining a display image.

The roughened surfaces diffuse a display image, thereby allowing obtaining an image that is easily viewed by a viewer. Although it is ideal that the reflective element surfaces Rf1_i and Rf2_i be roughened to become perfect diffuse surfaces, it is sufficient to roughen the reflective element surfaces Rf1_i and Rf2_i by usual processing such as sandblasting. Alternatively, white painting may be applied. The smoothness of the painted surface is reduced. The roughness obtained by spray painting or mat finishing is sufficient. The most preferable roughening process is that can form a sandy surface.

Roughening the reflective face 11 allows displaying an image on the reflective element surfaces, and efficiently specularly reflecting the light to the viewer side, thereby preventing nonuniform brightness in the screen. Furthermore, since the reflective face 11 is roughened, even if the position of the projection device is slightly shifted, diffused light on the surface prevents reduction in efficiency due to an angle shift of the reflection light 15 resulting from some position shift. Therefore, the allowable range of the installation position is increased.

The interface between the reflective element surfaces Rf1_i and Rf2_i is made of a material with a color, such as black, that has high optical absorbance to prevent reflection of ambient light.

Although the screen 100 is configured such that the projection light 14 is incident from the side of the flat surface (the transparent member 13 side) in the above-described embodiment, the screen 100 may alternatively be configured such that the projection light 14 is directly reflected by the reflective face 11 and travels to the viewer side.

Projectors include a CRT type and a light bulb type. Liquid crystal projectors, which are the light bulb type projectors, turn on and off the light utilizing polarization property of light. In the case where such a liquid crystal projector is used as the projection device 50, the projection light 14 is polarized. Especially in the case of three-color liquid crystal projectors, polarization properties often differ from color to color. It has been known that, if there is a refractive interface, the light that has transmitted through the refractive interface and the reflection light 15 that has been reflected by the refractive interface are polarization dependent. Therefore, in some cases, it is preferable that the screen 100 have no refractive interface. In such a case, direct reflection by the reflective element surfaces can reduce the influence of the polarization dependence.

Figure 7A:
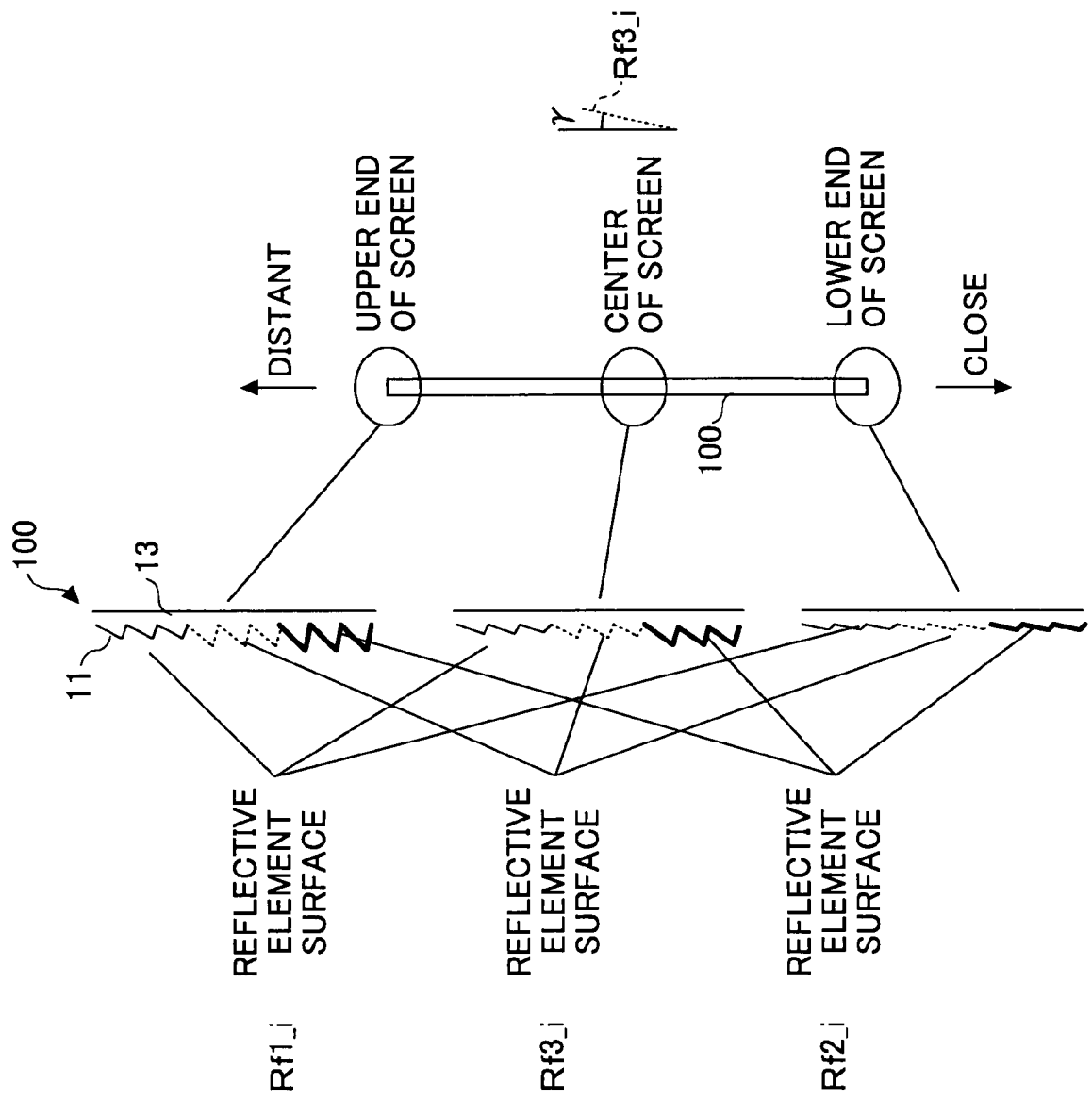
FIGS. 7A and 7B are cut-away side views each illustrating a screen that includes three types of reflective surfaces in a mixed form.

Although the screens 100 of FIGS. 5A-5C include two reflective surface sets 12A and 12B, the screen 100 may include three or more reflective surface sets 12 in a mixed form for further improvement of luminance uniformity. FIG. 7A is a cut-away side view of a screen 100 that includes reflective surface sets 12A, 12B, and 12C in a mixed form. The reflective surface set 12C includes elements defined as reflective element surfaces Rf3_i oriented to have angles that reflect light projected from a projection device spaced apart by a projection distance C, which is less than the projection distance A and is greater than the projection distance B, to provide optimum reflection light 15. The projection distance C is less than the projection distance A and is greater than the projection distance B. The reflective element surfaces Rf3_i are independent from each other in terms of configuration. However, the reflective element surfaces Rf3_i may be considered as one group because they are related to each other in that the angles γ increase with an increase of the distance from the intersection O.

In the screen 100 shown in FIG. 7A, arrays of a predetermined number of the reflective element surfaces Rf1_i, arrays of a predetermined number of the reflective element surfaces Rf2_i, and arrays of a predetermined number of the reflective element surfaces Rf3_i are alternately arranged. An inclination angle β is greater than an inclination angle γ in the substantially same position as the inclination angle position β. The inclination angle γ is greater than an inclination angle α in the substantially same position as the inclination angle position γ. Therefore, any given portion containing more than a predetermined number of reflective element surfaces Rf1_i, Rf2_i, and Rf3_i in the radial direction of the concentric circles includes a set of region of a region of the inclination angles α, a region of the inclination angles γ, and a region of the inclination angles β. The inclination angles α, β and γ gradually increase as the cycle is repeated.

In FIG. 7A, arrays of plural reflective element surfaces Rf1_i, arrays of plural reflective element surfaces Rf2_i, and arrays of plural reflective element surfaces Rf3_i are alternately arranged. Alternatively, as shown in FIG. 7B, individual reflective element surfaces Rf1_i-Rf3_i may be alternately arranged.

The alternating arrangement of the reflective element surfaces Rf1_i-Rf3_i of the reflective face 11 can prevent luminance variation even in a small range in the screen 100. This configuration can increase the allowable range of the projection positions A and B for the projection distance A and the projection distance B. In other words, because the reflective element surfaces that have optimum inclination angles γ for the projection device 50 of the projection distance C, even if the projection distance A is increased or the projection distance B is reduced, it is possible to reduce luminance drop due to a change in the projection distance.

Figure 7B:
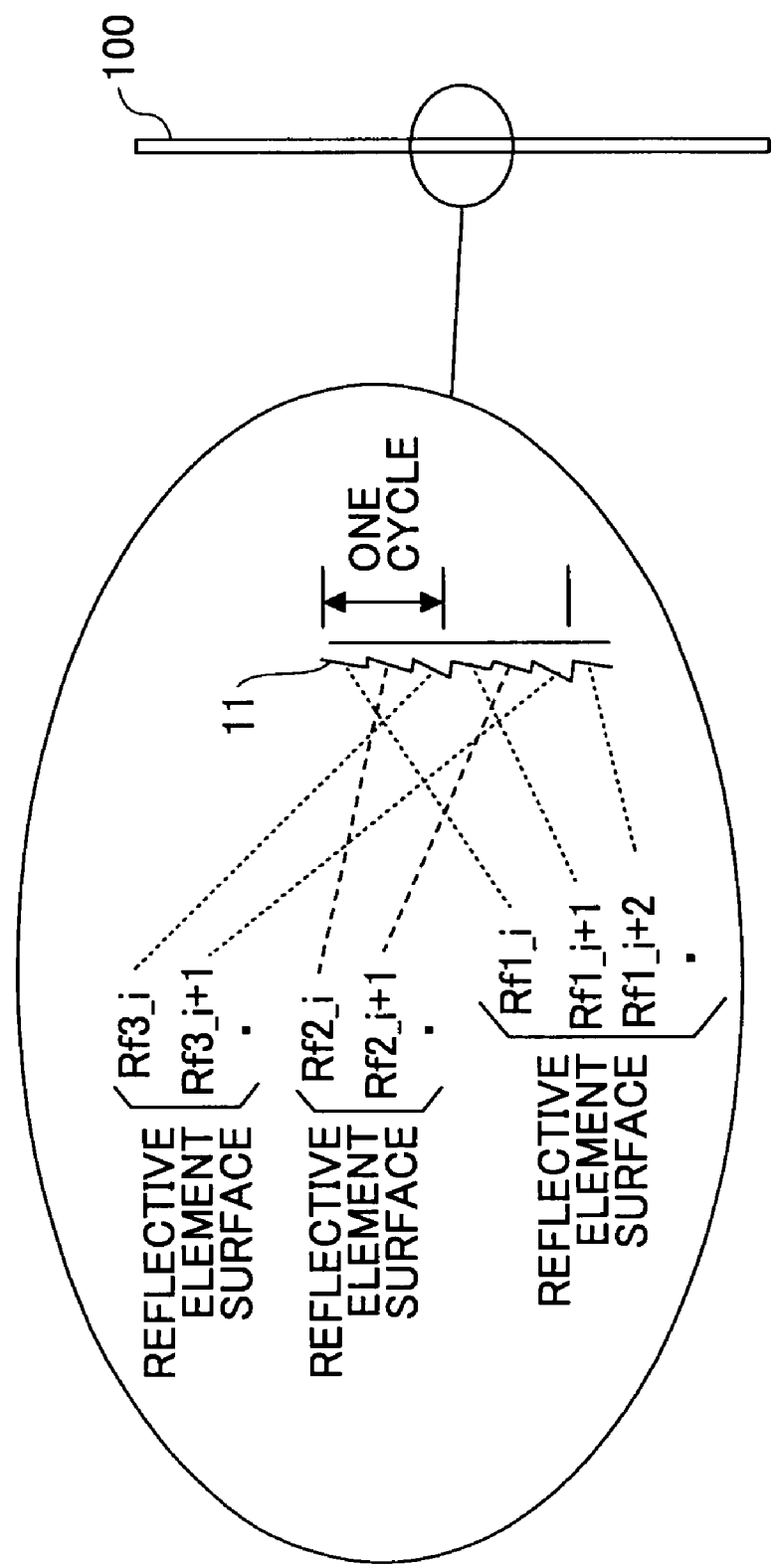

In FIGS. 7A and 7B, individual or arrays of predetermined number of reflective element surfaces Rf1_i-Rf3_i are alternately arranged. Alternatively, arrays of a random number of the reflective element surfaces Rf1_i, arrays of a random number of the reflective element surfaces Rf2_i, and arrays of a random number of the reflective element surfaces Rf3_i may be alternately arranged.

FIG. 8 is a cut-away side view illustrating a screen wherein arrays of a random number of the reflective element surfaces Rf1_i and arrays of a random number of the reflective element surfaces Rf2_i are alternately arranged. That is, although the arrays of the reflective element surfaces Rf1_i and arrays of the reflective element surfaces Rf2_i are alternately arranged, the number of consecutive reflective element surfaces Rf1_i and the number of consecutive reflective element surfaces Rf2_i are random.

When the number of the consecutive reflective element surfaces Rf1_i is n1_i and the number of consecutive reflective element surfaces Rf2_i is n2_i, then, in many cases, n1_1≠n1_2≠n1_3; n2_1≠n2_2≠n2_3; and n1_i≠n2_i.

For example, when the number of the consecutive reflective element surfaces in one array ranges from one to five, arrays of one or more, up to five, consecutive reflective element surfaces Rf1_i and arrays of one or more, up to five, consecutive reflective element surfaces of Rf2_i are alternately arranged. With this configuration, no cyclic serrated structure is formed on the display surface of the screen, resulting in preventing moire due to a cyclic structure.

Figure 9:
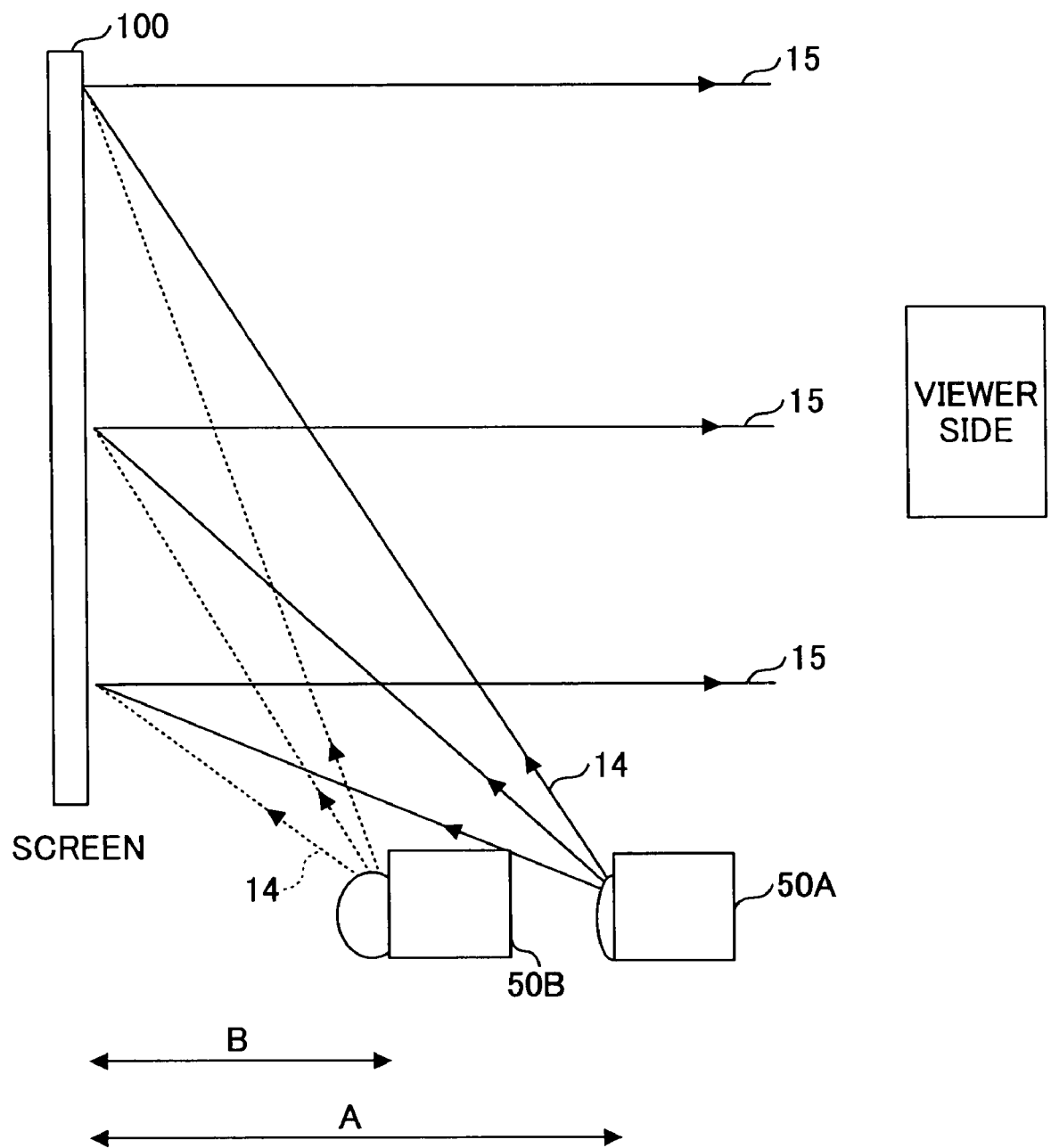
FIG. 9 is a diagram illustrating reflection by a screen that supports different projection devices having different image projection angles.

FIG. 9 is a diagram illustrating reflection by the screen 100 that supports different projection devices 50A and 50B having different image projection angles. The projection device 50A and the projection device 50B have different projection distances (image projection angles). The projection device 50A is configured to project an image of a predetermined size (corresponding to the entire screen 100 in FIG. 9) when located in a projection position A, while the projection device 50B is configured to project an image of the predetermined size when located in a projection position B. The screen 100 of this embodiment includes both the reflective element surfaces Rf1_i and Rf2_i that reflect lights projected from the projection positions A and B, respectively, to the viewer side, and therefore can display images from both the projection devices 50A and 50B while preventing luminance reduction at the distant side.

Figure 10:
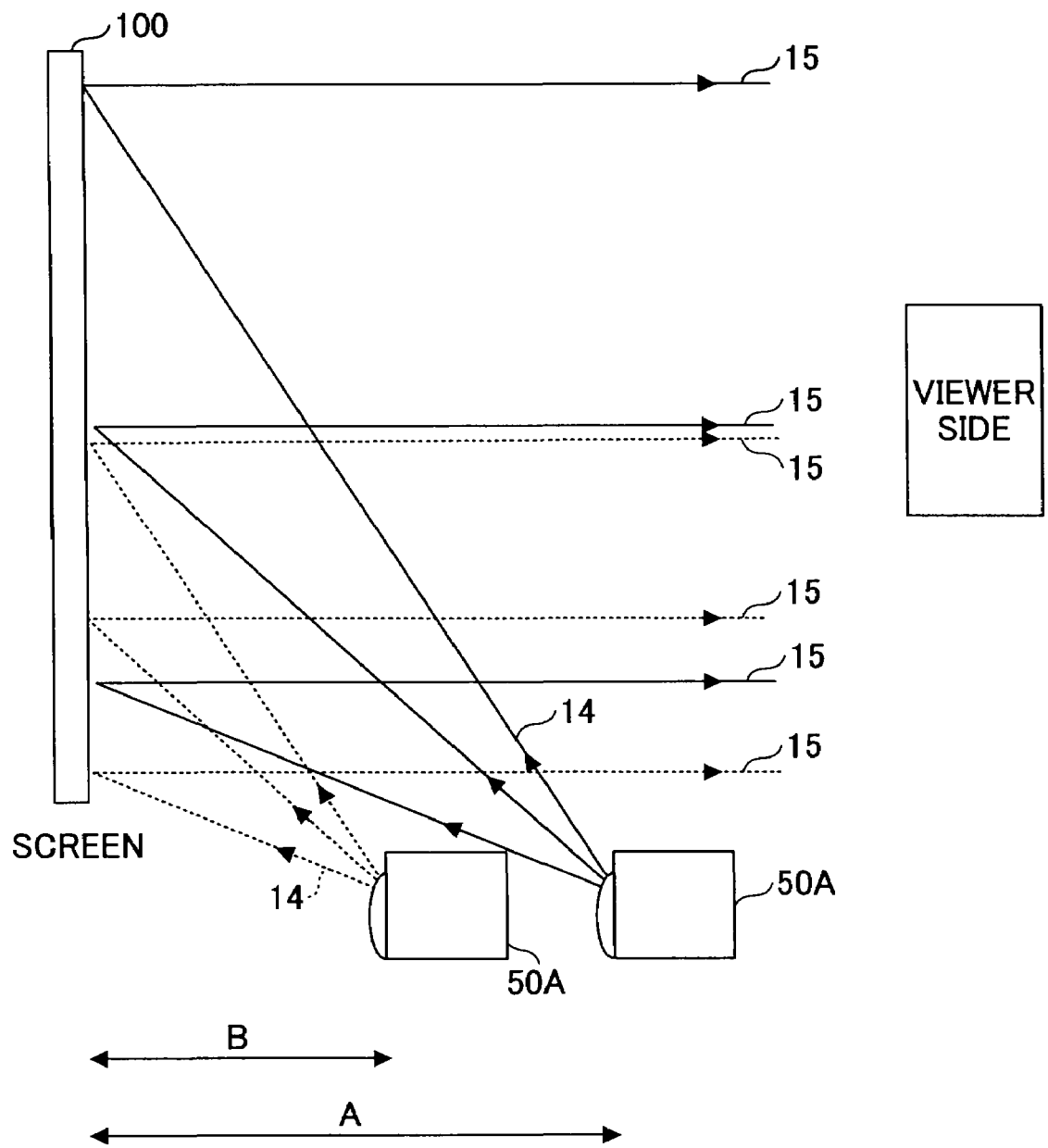
FIG. 10 is a diagram illustrating reflection by a screen that responds to a change in the position of a projection device having a predetermined image projection angle.

FIG. 10 is a diagram illustrating reflection by a screen 100 that responds to a change in position of the projection device 50A having a predetermined image projection angle. The projection device 50A projects an image of a predetermined size (corresponding to the entire screen 100 in FIG. 10) when located in the projection position A. The screen 100 of this embodiment includes the reflective element surfaces Rf1_i that reflect, to the viewer side, light from the projection device 50 spaced apart by the predetermined projection distance A and the reflective element surfaces Rf2_i that reflect, to the viewer side, light from the projection device 50 closely located at the projection distance B. Therefore the screen 100 can display an image while preventing luminance reduction at the distant side even if the projection distance is changed.

The advantageous effects of the screen 100 of this embodiment are described below. If the total area of the reflective element surfaces Rf1_i in the screen 100 is defined a reflective area 1 and the total area of the reflective element surfaces Rf2_i is defined a reflective area 2, the ratio of the first reflective area 1 to the second reflective area 2 is determined according a predetermined ratio corresponding to the projection distances A and B of the projection device 50.

Figure 11:
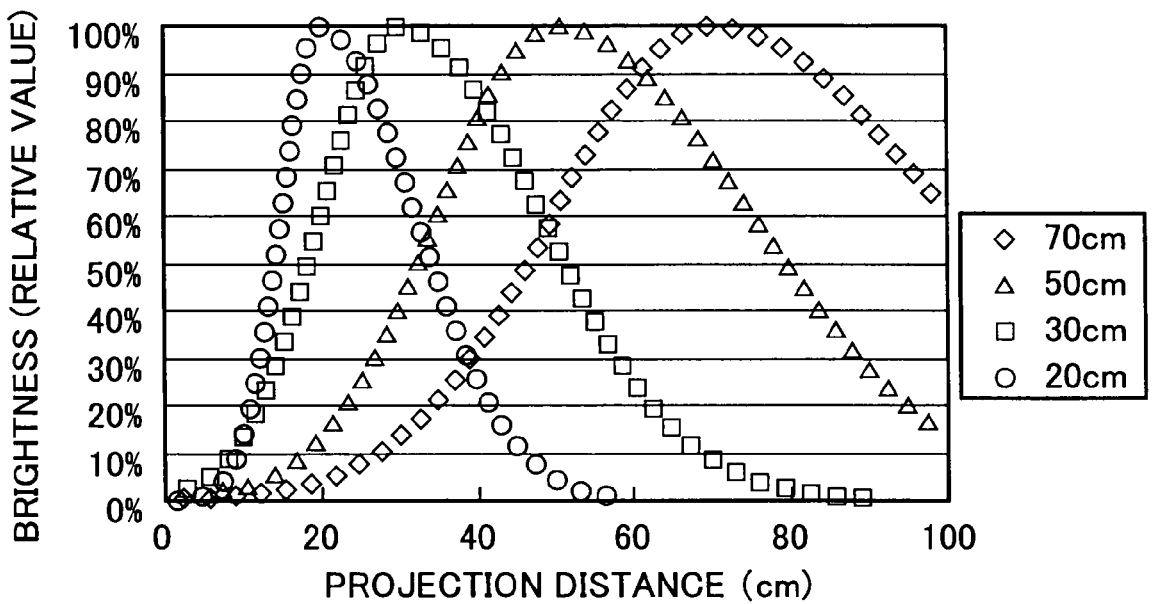
FIG. 11 is a graph showing fluctuations in the amount of light relative to the projection distance from projection devices, whose optimum projection distances are 70 cm, 50 cm, 30 cm, and 20 cm, respectively.

FIG. 11 is a graph showing fluctuations in the amount of light relative to the projection distance from projection devices 50, whose optimum projection distances are 70 cm, 50 cm, 30 cm, and 20 cm, respectively. The projection devices 50 used herein can project an image to be displayed with the diagonal size of 60 inches and the aspect ratio of 4:3. Accordingly, the projection device 50 of a 70 cm projection distance shows a peak of brightness when the projection distance is 70 cm; the projection device 50 of a 50 cm projection distance shows a peak of brightness when the projection distance is 50 cm; the projection device 50 of a 30 cm projection distance shows a peak of brightness when the projection distance is 30 cm; the projection device 50 of a 20 cm projection distance shows a peak of brightness when the projection distance is 20 cm.

For explanation purposes, the projection devices 50 are configured such that the light beam along the optical axis is incident with a lens shift of 100%, i.e., at about 0 degree with respect to (at right angle on) the screen 100 at the lower side (the closer side in the distance direction) of the projection screen. If the projection device 50 is located closer at a half the optimum projection distance, the upper side (the distant side) of the display screen is located at about half the height (near the center) of the screen 100. If the projection device 50 is located further closer, the image is displayed in the region lower than half the height of the screen 100. The results shown in FIG. 11 are estimated amounts of reflection light in the center of the screen 100 obtained if the image projection angle (the screen size) is increased.

For example, in the reflective surface set 12 having inclination angles optimized for the 70 cm projection distance, the amount of light reaches a peak at 70 degrees and decreases away from the peak. This is because the incident angle on the reflective face 11 that is optimized for the 70 cm projection distance varies.

As shown in the graph of FIG. 11, in the case where the projection device is optimized for 70 cm projection distance, if the projection device is located closer at a distance of 50 cm or less, the brightness is reduced to 50% of the brightness at the peak or less. Similarly, in the case of the projection devices optimized for other projection distances, the brightness sharply drops with a change in the projection distance. That is, the graph of FIG. 11 suggests that such a relative change in brightness is caused within the display screen.

Figure 12:
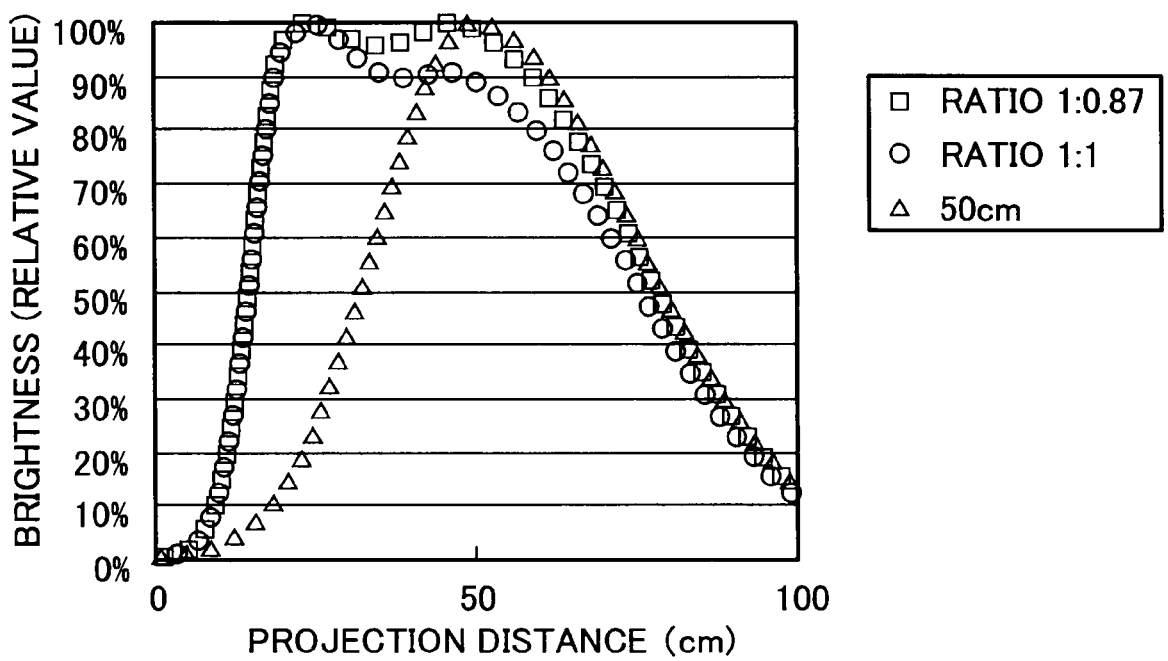
FIG. 12 is a graph showing relationships between the projection distance and the brightness in the case where plural (two) types of reflective element surfaces for plural (two) projection distances are arranged in a mixed form.

FIG. 12 is a graph showing relationships between the projection distance and the brightness in the screens 100 of this embodiment (hereinafter referred to as Type I) that include the reflective element surfaces Rf1_i and Rf2_i for supporting plural projection distances.

The screens 100 of Type I in FIG. 12 include the reflective element surfaces Rf1_i optimized for a 50 cm projection distance and the reflective element surfaces Rf2_i optimized for a 20 cm projection distance in a ratio of 1:1 and a ratio of 1:0.87, respectively.

Figure 13:
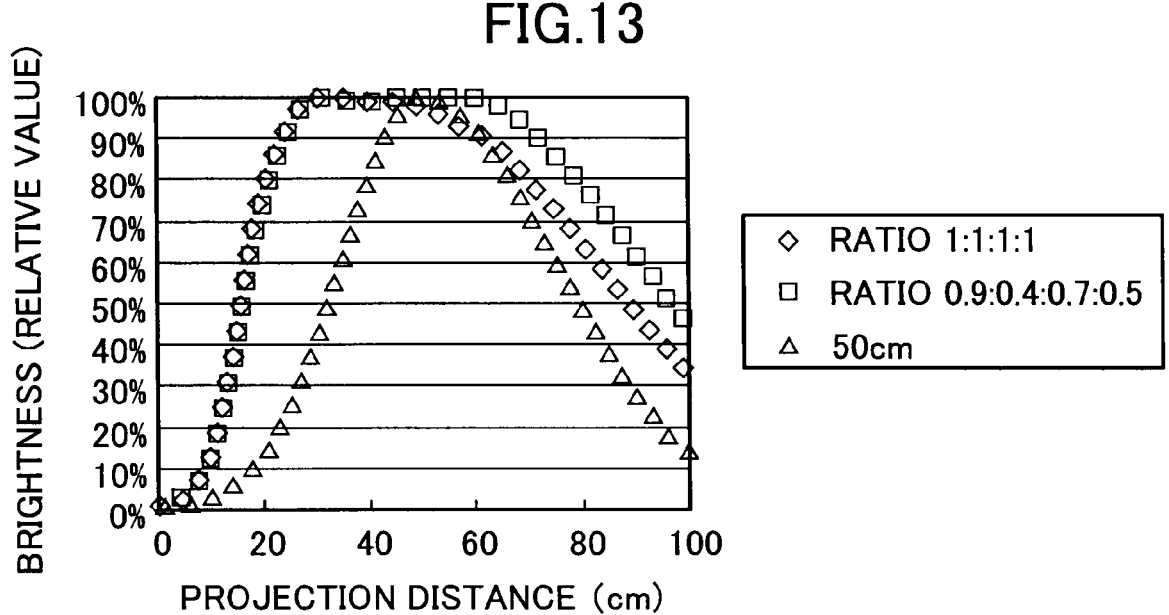
FIG. 13 is a graph showing relationships between the projection distance and the brightness in the case where plural (four) types of reflective element surfaces for plural (four) projection distances are arranged in a mixed form.

FIG. 13 is a graph showing relationships between the projection distance and the brightness in the screens 100 of this embodiment (hereinafter referred to as Type II) that include the reflective element surfaces Rf1_i, Rf2_i, Rf3_i, and Rf4_i. The screens 100 of Type II in FIG. 13 include the reflective element surfaces Rf1_i optimized for a 70 cm projection distance, the reflective element surfaces Rf2_i optimized for a 50 cm projection distance, the reflective element surfaces Rf3_i optimized for a 30 cm projection distance, and the reflective element surfaces Rf4_i optimized for a 20 cm projection distance in a ratio of 1:1:1:1 and a ratio of 9:4:7:5, respectively.

As shown in FIG. 12, the screen supporting only a 50 cm projection distance as comparative example showed a sharp brightness peak. On the other hand, the range of the distance that has a less than 10% variation in the amount of light is increased by simply including the reflective element surfaces Rf1_i and Rf2_i optimized for different projection distances in a ratio of 1:1 as in the case of Type I. The variation in the amount of light was further reduced by appropriately determining the mixing ratio (1:0.87 in this example).

As shown in FIG. 13, in the case of Type II, the one with the mixing ratio of 9:4:7:5 reduces the variation in the amount of light to a greater extent than the one with the mixing ratio of 1:1:1:1.

As can be seen, in both cases of Types I II, the allowable range of the installation position of the projection device 50 is increased by including plural types of reflective element surfaces. Further, brightness uniformity can be further improved by adjusting the ratio of the plural types of the reflective element surfaces. The ratio may be adjusted by increasing the area ratio of the reflective element surfaces of the type optimized for the projection distance that is closer to a desired projection distance.

The maximum brightness of Type I and Type II is lower than that of the screen optimized for a single projection distance. However, the maximum brightness can be increased by adjusting the brightness of the projection device 50.

In FIG. 13, if the projection distance having up to 50% reduction in brightness is allowable, the allowable range of the projection distance for the screen for a 50 cm distance is less than 50 cm variation. On the other hand, the allowable range of the projection distance for Type I (100:87) is 65 cm variation, and the allowable range of the projection distance for Type II (9:4:7:5) is nearly 80 cm variation.

As described above, the screens 100 of this embodiment are focused on achieving uniformity in brightness within the screen even with a change in the projection position. The brightness is represented by relative value in the same screen 100. The non-uniformity in brightness within the screen is eliminated in this embodiment, which indicates that this embodiment is very effective.

Second Embodiment

In the first embodiment, the reflective face 11 includes flat surfaces forming a serrated shape. However, assuming that an infinite number of reflective element surfaces Rfn_i (n:1, 2, 3, . . . ) are present, the reflective face 11 may be formed of plural curved surfaces formed by the reflective element surfaces Rfn_i. This configuration improves diffusion effects of the reflective face 11, and prevents reduction of uniformity within the screen due to a shift of the projection position from a preferable projection distance for the reflective face 11 of flat surfaces.

Figure 14:
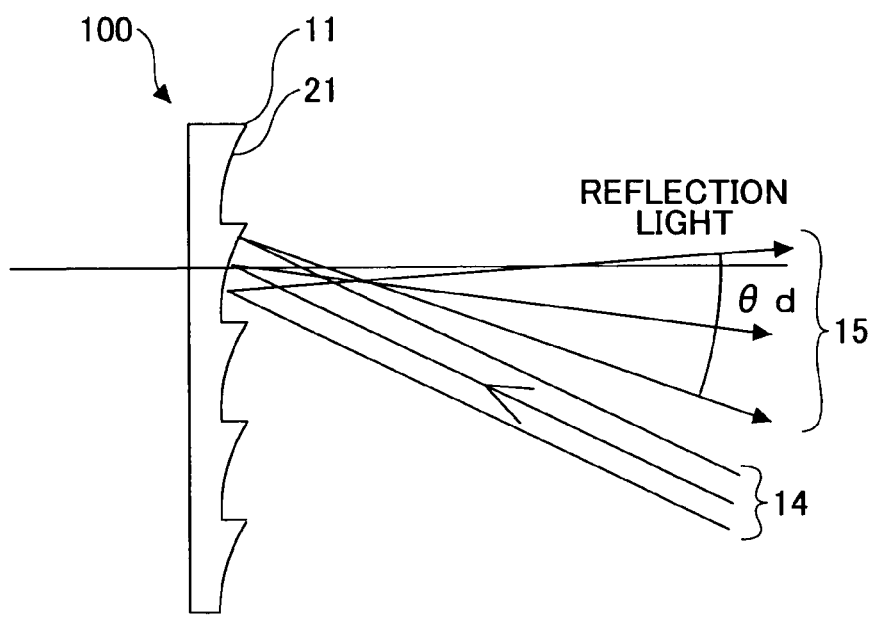
FIG. 14 is a cut-away side view illustrating a screen comprising a reflective surface that includes recessed surfaces.

FIG. 14 is a cut-away side view illustrating a screen 100 comprising a reflective face 11 that includes plural inwardly-curved surfaces, i.e., recessed surfaces 21. Each of the recessed surfaces 21 corresponds to one cycle in FIG. 5A, 5B, 5C, 7A, or 7B, and includes a very large number of the reflective element surfaces Rfn_i.

Each recessed surface 21 has a substantially 0 degrees inclination angle at a first side (the side closer to the intersection) and has an inclination angle at the other side (the side distant from the intersection) which inclination angle at the other side has the same magnitude as an inclination angle of the reflective element surface Rfn_i optimized for the shortest projection distance. The average inclination angles of the recessed surfaces 21 increase with an increase of the distance from the intersection.

The projection light 14 from the predetermined projection distance is specularly reflected by the recessed surfaces 21, resulting in the reflection light 15 with some angle θd. That is, although not all the beams of the reflection light 15 are polarized to travel to the viewer side, the provision of some variation can enhance the viewing angle properties. Therefore, together with reflection from the recessed surfaces 21 it is possible to prevent reduction in uniformity in brightness within the screen due to a shift of the projection position. The curvatures of the recessed surfaces 21 increase with an increase of the distance from the intersection. Accordingly, as in the case of the first embodiment, luminance reduction at the distant side is prevented.

It is to be noted that, in the case of the screen of Patent Document 3, because the reflective surfaces are formed on the spherical projecting portions, the diffusion effects are dependent on the diameters of the spheres. Although the screen of Patent Document 3 provides high diffusion effects to substantially increase the viewing angle, problems arise if a display device does not provide a sufficient brightness. In the case of the screen 100 of this embodiment, the reflective face 11 can have very low curvature, allowing the reflective surface to have an appropriate shape while controlling the diffusion rate.

Third Embodiment

In this embodiment, a display system 10 is described that use the screen 100 and the projection device 50 described in the first embodiment 1 or the second embodiment.

A front type projector is preferable as the projection device 50. The projector includes a liquid crystal panel, a digital micro mirror, and a microdisplay (light bulb). Illumination light is emitted onto the microdisplay, and ON/OFF control of light transmission is performed by switching the light on a per pixel basis; thereby an image is formed.

Figure 15:
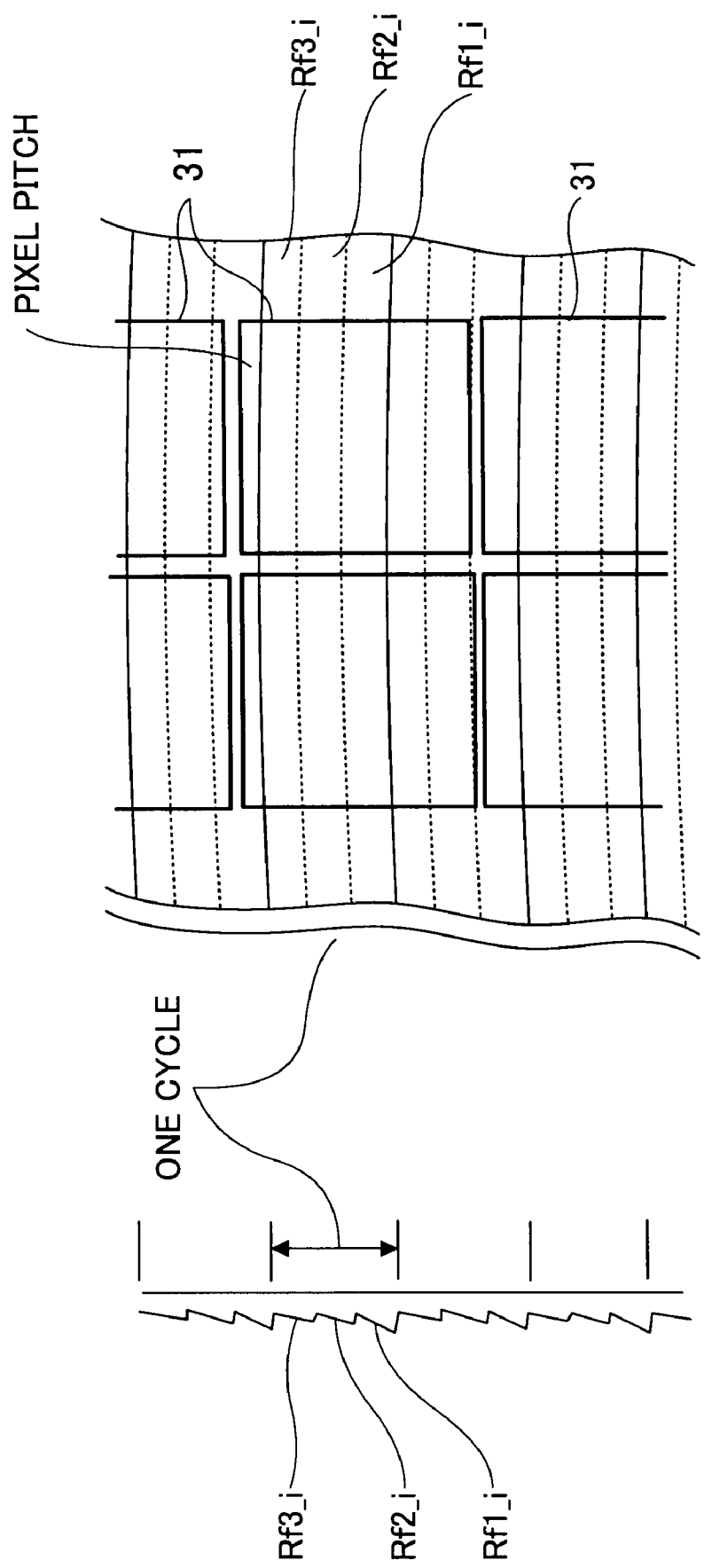
FIG. 15 is a schematic diagram illustrating pixel pitches of projected pixels of a projector.

This image is enlarged and projected by a projection lens onto the screen 100 of the first or second embodiment. That is, the pixels of the microdisplay are enlarged and projected. FIG. 15 is a schematic diagram illustrating pixel pitches 31 of the projected pixels of the projector.

In the screen 100 of this embodiment, all the types of reflective element surfaces that constitute the screen 100 are present in each pixel.

For example, the screen 100 of a 60-inch diagonal size and a 4:3 aspect ratio has a screen size of 914.4 mm in height and 1219.2 mm in width. If projectors with resolutions of VGA (640 pixels in width), XGA (1024 pixels in width), and SXGA (1280 pixels in width) project an image on this screen 100, the pixel pitches 31 are 1.91 mm (VGA), 1.19 mm (XGA), and 0.95 mm (SXGA).

Although there are portions such as black matrix between pixels which cannot be displayed, if the fact that the resolution performance of the projection lens does not achieve 100 percent (i.e., the image blurs) is taken into account, the pixel pitch 31 can be considered to have substantially the same size as the size of one pixel. That is, all the types of reflective element surfaces are present in each of the pixel pitches 31.

In the case where two types of reflective element surfaces Rf1_i and Rf2_i are alternately arranged, in order to have two or more reflective element surfaces in each pixel pitch 31, even if the position between the pixel pitches 31 is aligned with the position between the pairs of the reflective element surfaces Rf1_i and Rf2_i, the size (hereinafter referred to as a width) of one reflective element surface is ½ the pixel pitch 31 or less.

In reality, the position between the pixel pitches 31 is rarely aligned with the position between the pairs of the reflective element surfaces Rf1_i and Rf2_i, so that the width of the reflective element surface is preferably less than ⅓ the pixel pitch 31. More specifically, the width of each reflective element surface is less than 0.635 mm in the case of VGA, 0.397 mm in the case of XGA, and 0.318 mm in the case of SXGA. In the case of projecting a screen size greater than 60 inch, the width of each reflective element surface may be increased (the pixel pitch 31 is increased). In the case of projecting a smaller screen, the width of each reflective element surface needs to be reduced (the pixel pitch 31 is reduced). In the case of projecting the projection lights 14 of the same screen size, the greater the number of types of the reflective element surfaces is, the less the width of each reflective element surface needs to be such that all the types of the reflective element surfaces are present in each pixel pitch.

In FIG. 15, three reflective element surfaces Rf1_i-Rf3_i are sequentially arranged. In order to include the three reflective element surfaces Rf1_i-Rf3_i in one pixel pitch 31, the width of each of the reflective element surfaces Rf1_i-Rf3_i is preferably less than ¼ the pixel pitch 31. It is to be noted that when at least one or more types of the reflective element surfaces are included in the pixel pitch 31, the minimum projection light 14 is reflected.

As described above, the provision of high-definition reflective element surfaces appropriate for the resolution of the projector or the pixel pitch 31 can reduce brightness variation of the projection light 14 in each pixel, thereby obtaining a high quality display image.

<Angle of View of the Projection Device 50>

The screens 100 of the first and second embodiments can reduce luminance variation even if the position of the projection device 50 located within a short distance is shifted. Such a screen 100 can be suitably used with the projection device 50 having a large angle of view. More specifically, even if the projection device 50 of a 40-degree screen incident angle or greater is used to form the display system 10, luminance reduction at the periphery of the screen 100 can be prevented.

Generally, the light beams incident on the periphery of the screen 100 have the greatest incident angle. The projection device 50 used in this embodiment have the greatest incident angle being 40 degrees or greater. In other words, the display system 10 display an image using the projection device 50 having a projection lens having a 40 degree half-angle of view or greater and the screen 100. The displayed image size can be adjusted using a zoom function of the projection device 50 or changing the distance to the screen 100.

Figure 18:
FIG. 18 is a graph showing an example of brightness variation with respect to the incident angle of projection light on a screen.

The reason why 40 degrees is selected is described below. The screen incident angle of the projection light 14 and the effective brightness were measured using a commercially available projector. The measurement results are shown in FIG. 18. The projector used was a 3-CCD projector using a transmissive liquid crystal panel, the screen used was a commercially available reflective screen (i.e., the related-art reflective screen).

The position of the projector was determined such that light beams were intentionally diagonally projected from the projector. While changing the inclination of the projection light 14 but maintaining a constant "linear distance" between the projection lens and the determined position so as not to change the light beams in the determined projection position, the luminance on the screen surface was measured. The luminance was measured by a commercially available luminance meter placed in the direction perpendicular to the screen surface.

The measurement results indicated by square symbols can be substantially approximated by a straight line. As the incident angle on the screen increases, the luminance (substantial brightness) decreases. Accordingly, it is easily understood that, if the incident angle of the projection light 14 varies within the screen, the brightness varies according to the incident angle.

Generally, if there is a variation of 50%, the variation is thought to become visually noticeable. In expectation of the uniformity of the amount of light of the projection device being about 80%, in order to achieve a high display quality, variation in the screen is preferably within 40% to be on the safe side.

It is found from the graph of FIG. 18 that the range of the incident angle assuring a reduction within 40%, i.e., a luminance of 60% or greater relative to the reference luminance, is 40 degrees or greater. That is, the likelihood that variation becomes visible on the screen increases about when the incident angle exceeds 40 degrees. When the incident angle is 50 degrees or greater, the brightness variation exceeds 50%, resulting in a problem in terms of uniformity of the amount of light.

This analysis suggests that the display quality can be substantially improved by using the screen 100 of the first or second embodiment for the projection device 50 of an incident angle of 40 degrees or greater on the screen 100, especially the projection device 50 of an incident angle of 50 degrees or greater.

<Scale for Measuring a Preferable Projection Position>

As described in the first and second embodiments, the screen 100 includes both the reflective element surfaces Rf1_i and Rf2_i that reflect lights projected from the projection positions A and B, respectively, to the viewer side. Therefore, the screen 100 can most easily demonstrate its performance when the projection device 50 is positioned between near the projection position A and near the projection position B. It is therefore preferable to determine the projection position of the projection device 50 by measuring the distance to the screen 100 using a scale 32.

Figure 16:
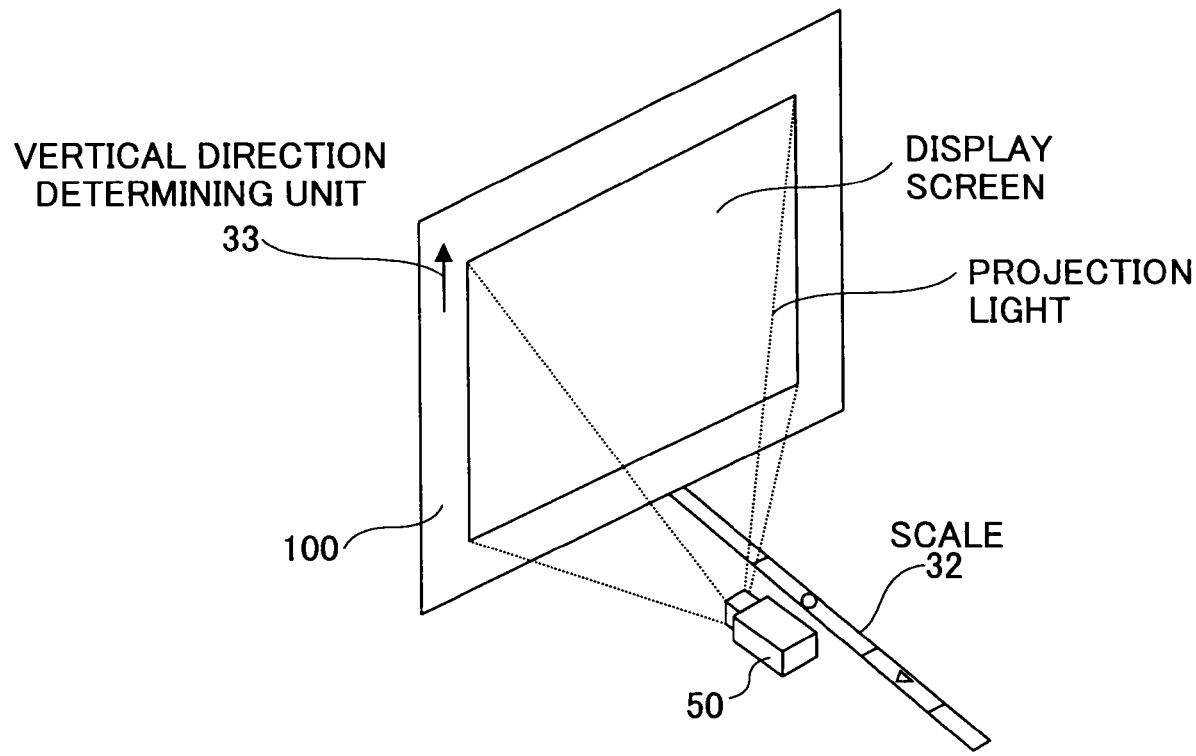
FIG. 16 is a schematic perspective view illustrating a display system wherein a projection position is determined using a scale.
Figure 17A:
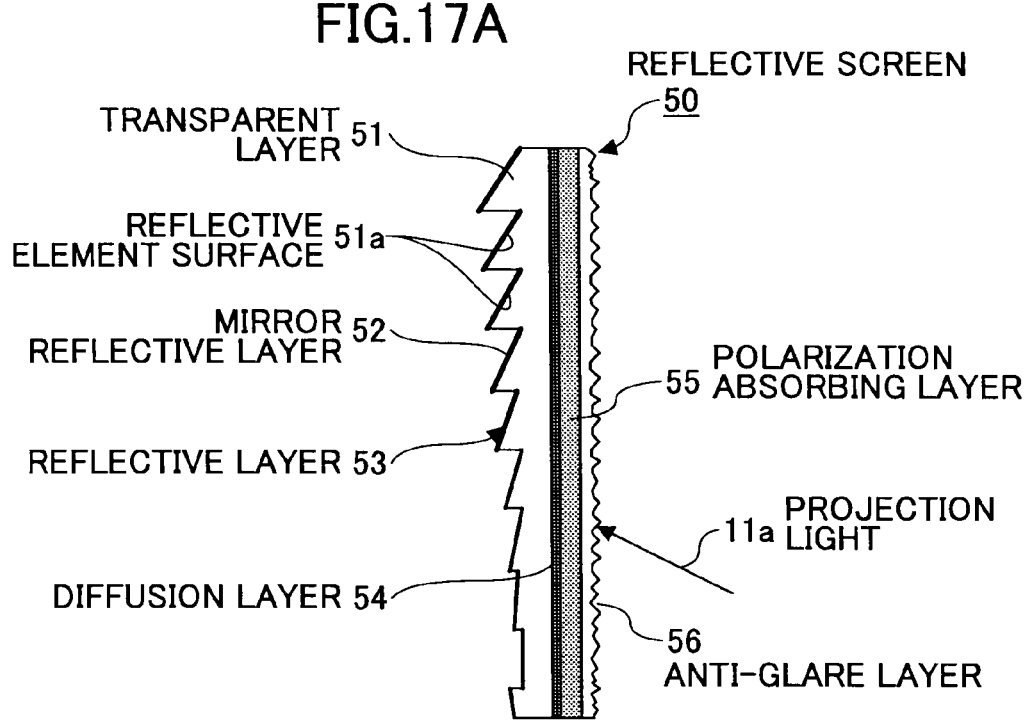
FIGS. 17A-17C are cut-away side views illustrating related-art screens.
Figure 17C:
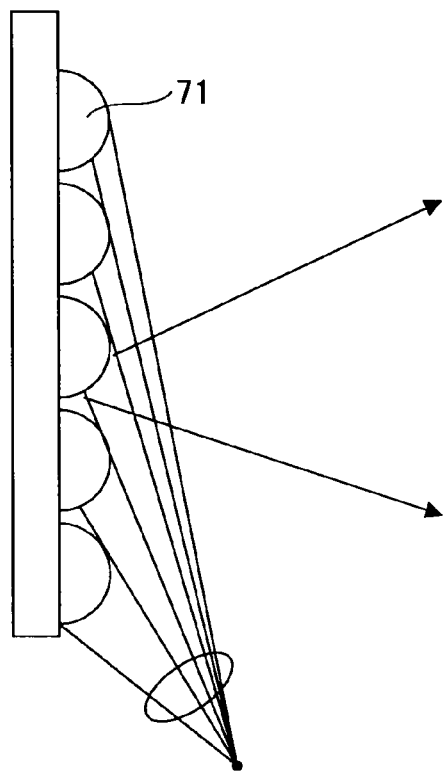
Figure 17B:
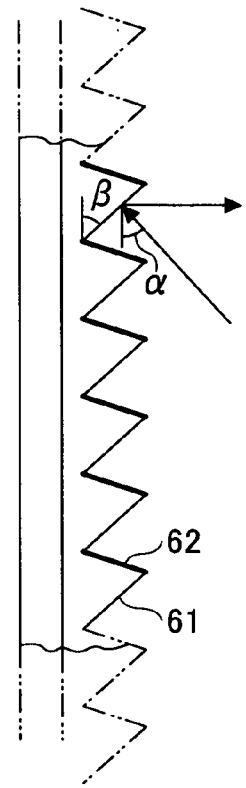

FIG. 16 is a schematic perspective view illustrating a display system 10 wherein the projection position is determined using the scale 32. The screen 100 includes the scale 32 that indicates a range of the position that achieves a preferable distance. For example, the scale 32 may be a film with a circle symbol indicating a preferable position and a triangle symbol indicating a range that allows an image to be displayed or viewed in a satisfactory manner although there is some variation in brightness. The positions of the circle symbol and triangle symbol may be determined by a user. The circle symbol and triangle symbol may be moved or drawn in accordance with the projection device 50 to be used. Because the scale 32 is used only when installing the projection device 50, the scale 32 may be removed after completion of installation of the projection device 50. Alternatively, the scale 32 may be connected at a screen 100-side-end to the screen 100 by a pin such that the scale 32 is stored by being rotated to be parallel to the reflective face 11. The scale 32 may be extensible.

The scale 32 does not have to be a visual indicator. That is, a preferable position may be indicated by sounds or the like as the projection device 50 is moved.

The scale 32 may alternatively be included in the projection device 50. The projection device 50 may include a laser interferometer or a triangulation system as the scale 32. Alternatively, a projected image may be photographed by a photographing unit and the size of the projected image calculated based on the magnification of the projection lens.

The provision of the above-described scale 32 allows the preferable position of the projection device 50 to be easily identified.

<Detection of the Vertical Direction of The Screen 100>

Because the reflective element surfaces are oriented in predetermined directions in the screen 100, the screen 100 has a preferable installation position for the projection device 50. For example, if the projection device 50 is positioned to face the upper end of the screen 100 designed such that the intersection O is located at the lower end of the screen 100, an image preferable for the viewer side cannot be displayed. It is therefore preferable that the screen 100 include a vertical direction determining unit 33 that determines the vertical direction of the screen 100 or the vertical direction of the projected image.

As shown in FIG. 16, the vertical direction determining unit 33 may be an up arrow. The vertical direction determining unit 33 may be formed by application of paint, may be formed at the same time when forming the screen 100, or may be formed by attaching a sticker. The vertical direction determining unit 33 may be removable or erasable because it is not required after completion of installation of the projection device 50. If the vertical direction determining unit 33 is removable, the vertical direction determining unit 33 can be placed at any position on the screen 100. The vertical direction determining unit 33 does not have to be used alone for determining the vertical direction and may be used with other items (e.g. an instruction manual) that include a description about the vertical direction. More specifically, even if the vertical direction determining unit 33 is a symbol such as "♦" that does not indicate the vertical direction, a description indicating that the side with the symbol "♦" is the upper side may be included in an instruction manual supplied with the screen 100, thereby enabling determination of the vertical direction. This configuration also falls under the scope of the present invention.

As described above, the screen 100 and the display system 10 of the above-described embodiments can reduce luminance variation of an image projected from the projection device located within close range and can reduce luminance variation and luminance decline due to a change in position of the projection device 50.

The present application is based on Japanese Priority Application No. 2007-147355 filed on Jun. 1, 2007, with the Japanese Patent Office, the entire contents of which are hereby incorporated by reference.

What is claimed is:

1. A reflective screen configured to display an image projected from a projection device located within a short distance, the reflective screen comprising:
    a first reflective surface configured to reflect, in a substantially same direction, projection light beams projected from a first position; and
    a second reflective surface configured to reflect, in said substantially same direction, projection light beams projected from a second position different from the first position
    wherein the first reflective surface includes plural first reflective element surfaces that have increasing inclination angles corresponding to respective distances from a predetermined position, and the second reflective surface includes plural second reflective element surfaces that have increasing inclination angles corresponding to respective distances from the predetermined position,
    wherein the first reflective element surfaces and the second reflective element surfaces are arranged in a mixed form, and
    wherein arrays of a predetermined number of the first reflective element surfaces and arrays of the predetermined number of the second reflective element surfaces are alternately arranged in a radial direction of concentric circles having a center on the predetermined position.

2. The reflective screen as claimed in claim 1, wherein, in the case where the second position is closer to the reflective screen than is the first position, if an allowable range of an installation position in a direction closer to the reflective screen is greater than the allowable range of the installation position in a direction distant from the reflective screen, the area of the second reflective surface is greater than the area of the first reflective surface.

3. The reflective screen as claimed in claim 1, further comprising:
    a third reflective surface configured to reflect, in said substantially same direction, projection light beams projected from a third position different from the first position and the second position.

4. The reflective screen as claimed in claim 1, wherein the first reflective element surfaces and the second reflective element surfaces are continuously connected to form plural recessed portions.

5. The reflective screen as claimed in claim 1, wherein the first reflective surface and the second reflective surface are roughened.

6. The reflective screen as claimed in claim 1, further comprising:
    a scale unit configured to indicate a position close to the first position or the second position.

7. The reflective screen as claimed in claim 1, further comprising:
    a vertical direction determining unit configured to determine a vertical direction of the reflective screen or a vertical direction of the image.

8. The reflective screen as claimed in claim 7, wherein the vertical direction determining unit is removable or erasable.

9. A display system comprising:
    the reflective screen and the projection device of claim 1,
    wherein one or more of the first reflective element surfaces or the second reflective element surfaces is present in a pixel pitch of pixels projected on the reflective screen.

10. The display system as claimed in claim 9, wherein a screen incident angle of the projection device is 40 degrees or greater.

11. A reflective screen configured to display an image projected from a projection device located within a short distance, the reflective screen comprising:
    a first reflective surface configured to reflect, in a substantially same direction, projection light beams projected from a first position; and
    a second reflective surface configured to reflect, in said substantially same direction, projection light beams projected from a second position different from the first position,
    wherein the first reflective surface includes plural first reflective element surfaces that have increasing inclination angles corresponding to respective distances from a predetermined position, and the second reflective surface includes plural second reflective element surfaces that have increasing inclination angles corresponding to respective distances from the predetermined position,
    wherein the first reflective element surfaces and the second reflective element surfaces are arranged in a mixed form, and
    wherein the individual first reflective element surfaces and the individual second reflective element surfaces are alternately arranged in a radial direction of concentric circles having a center on the predetermined position.

12. A display system comprising:
    the reflective screen and the projection device of claim 11,
    wherein one or more of the first reflective element surfaces or the second reflective element surfaces is present in a pixel pitch of pixels projected on the reflective screen.

13. The display system as claimed in claim 12, wherein a screen incident angle of the projection device is 40 degrees or greater.

14. A reflective screen configured to display an image projected from a projection device located within a short distance, the reflective screen comprising:
    a first reflective surface configured to reflect, in a substantially same direction, projection light beams projected from a first position; and
    a second reflective surface configured to reflect, in said substantially same direction, projection light beams projected from a second position different from the first position,
    wherein the first reflective surface includes plural first reflective element surfaces that have increasing inclination angles corresponding to respective distances from a predetermined position, and the second reflective surface includes plural second reflective element surfaces that have increasing inclination angles corresponding to respective distances from the predetermined position, wherein the first reflective element surfaces and the second reflective element surfaces are arranged in a mixed form, and wherein arrays of a random number of the first reflective element surfaces and arrays of a random number of the second reflective element surfaces are alternately arranged in a radial direction of concentric circles having a center on the predetermined position.

15. A display system comprising:

the reflective screen and the projection device of claim 14, wherein one or more of the first reflective element surfaces or the second reflective element surfaces is present in a pixel pitch of pixels projected on the reflective screen.

16. The display system as claimed in claim 15, wherein a screen incident angle of the projection device is 40 degrees or greater.

* * * * *